US007567816B2

(12) United States Patent
Hasegawa

(10) Patent No.: US 7,567,816 B2
(45) Date of Patent: Jul. 28, 2009

(54) RADIO COMMUNICATIONS SYSTEM AND METHOD FOR RADIO COMMUNICATIONS

(75) Inventor: Naoki Hasegawa, Tokyo (JP)

(73) Assignee: NEC Corporation (JP)

( * ) Notice: Subject to any disclaimer, the term of this patent is extended or adjusted under 35 U.S.C. 154(b) by 732 days.

(21) Appl. No.: 10/950,647

(22) Filed: Sep. 28, 2004

(65) Prior Publication Data

US 2005/0075121 A1 Apr. 7, 2005

(30) Foreign Application Priority Data

Oct. 3, 2003 (JP) ............................. 2003-346276

(51) Int. Cl.
*H04B 15/00* (2006.01)
(52) U.S. Cl. .................. 455/518; 455/414.2; 455/415; 455/416; 455/428; 455/432.3; 455/433; 455/435.1; 455/514; 455/517; 455/519; 455/520; 455/90.2
(58) Field of Classification Search ................ 455/517, 455/518, 519, 90.2, 414.2, 415, 416, 428, 455/432.3, 433, 435.1, 514, 520
See application file for complete search history.

(56) References Cited

U.S. PATENT DOCUMENTS

| 6,449,491 | B1* | 9/2002 | Dailey ........................ 455/518 |
| 6,882,856 | B1* | 4/2005 | Alterman et al. ............. 455/519 |
| 6,885,874 | B2* | 4/2005 | Grube et al. ................. 455/520 |
| 2002/0037736 | A1* | 3/2002 | Kawaguchi et al. ......... 455/518 |
| 2003/0017836 | A1* | 1/2003 | Vishwanathan et al. ..... 455/517 |
| 2003/0153339 | A1* | 8/2003 | Crockett et al. ............. 455/518 |
| 2003/0190888 | A1 | 10/2003 | Mangal et al. |
| 2004/0032843 | A1* | 2/2004 | Schaefer et al. ............. 370/338 |
| 2004/0192364 | A1 | 9/2004 | Ranalli et al. |

FOREIGN PATENT DOCUMENTS

| JP | 10-136452 A | 5/1998 |
| JP | 2001-513614 A | 9/2001 |
| JP | 2005-506728 A | 3/2005 |
| WO | WO 03/067363 A3 | 8/2003 |
| WO | WO 03/069943 A1 | 8/2003 |
| WO | WO 2004/017525 A3 | 2/2004 |

OTHER PUBLICATIONS

"iDEN Technical Overview"; Motorola Inc. Network Solution Sector; Retrived from URL http://idenphones.motorla.com/iden/developer/developer_technical_info.jsp; Chapter 4: Dispatch Call Processing, Section 4-3: Dispatch Location Area, Figure 4-3 Simplified Dispatch Diagram.

* cited by examiner

*Primary Examiner*—Lana N Le
*Assistant Examiner*—Ping Y Hsieh
(74) *Attorney, Agent, or Firm*—Dickstein, Shapiro, LLP.

(57) ABSTRACT

A radio communications system that eliminates limitation on usage forms of radio communication and enables users to implement radio communication easily. CUG (Closed User Group) servers of communication carriers are provided to an outside company such as ASP (Application Service Provider), and group information of PTT communication terminal devices for performing radio communication processing among particular PTT communication terminal devices is registered in the CUG servers provided outside so that the PTT communication terminal devices are controlled.

148 Claims, 12 Drawing Sheets

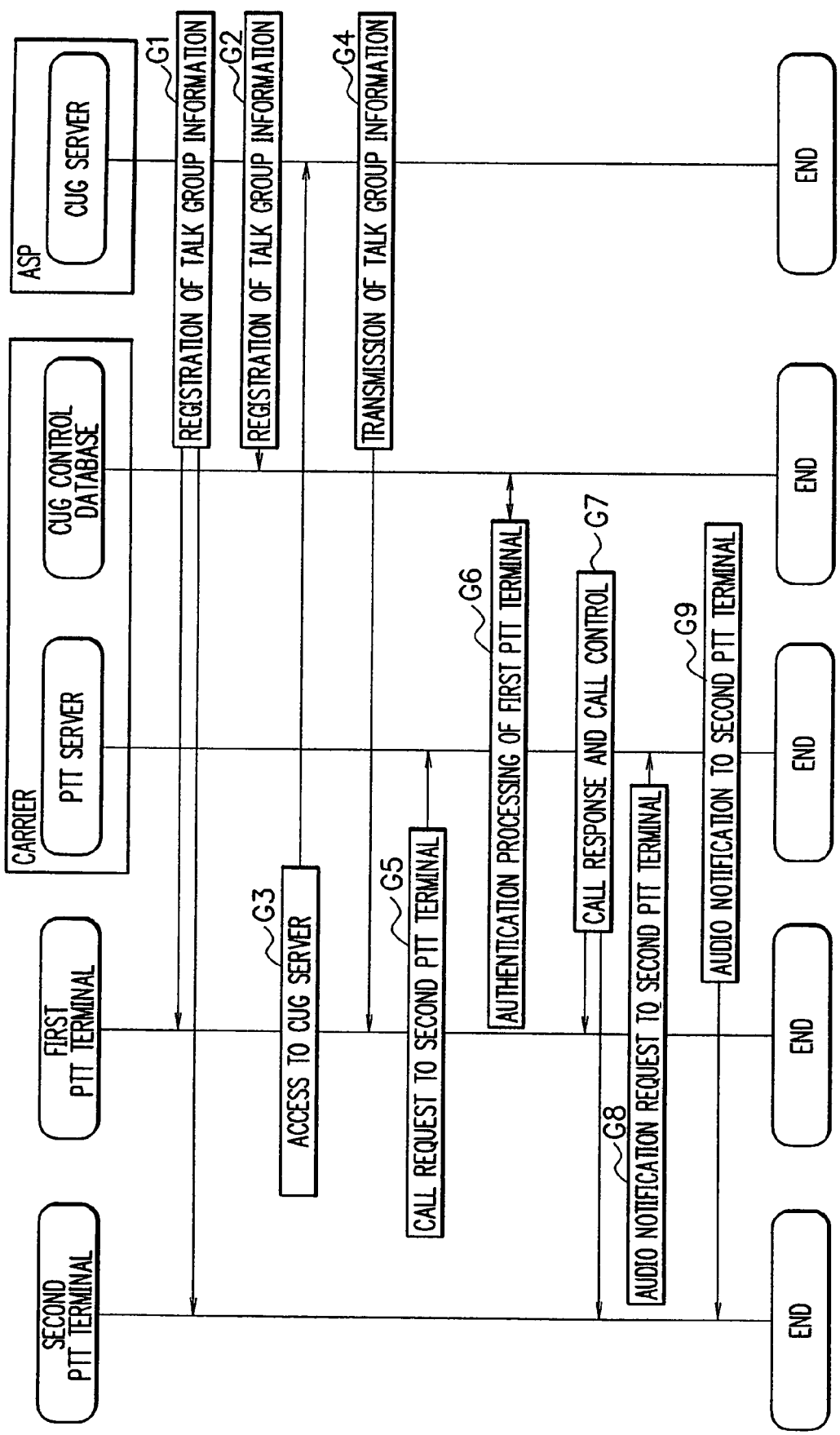

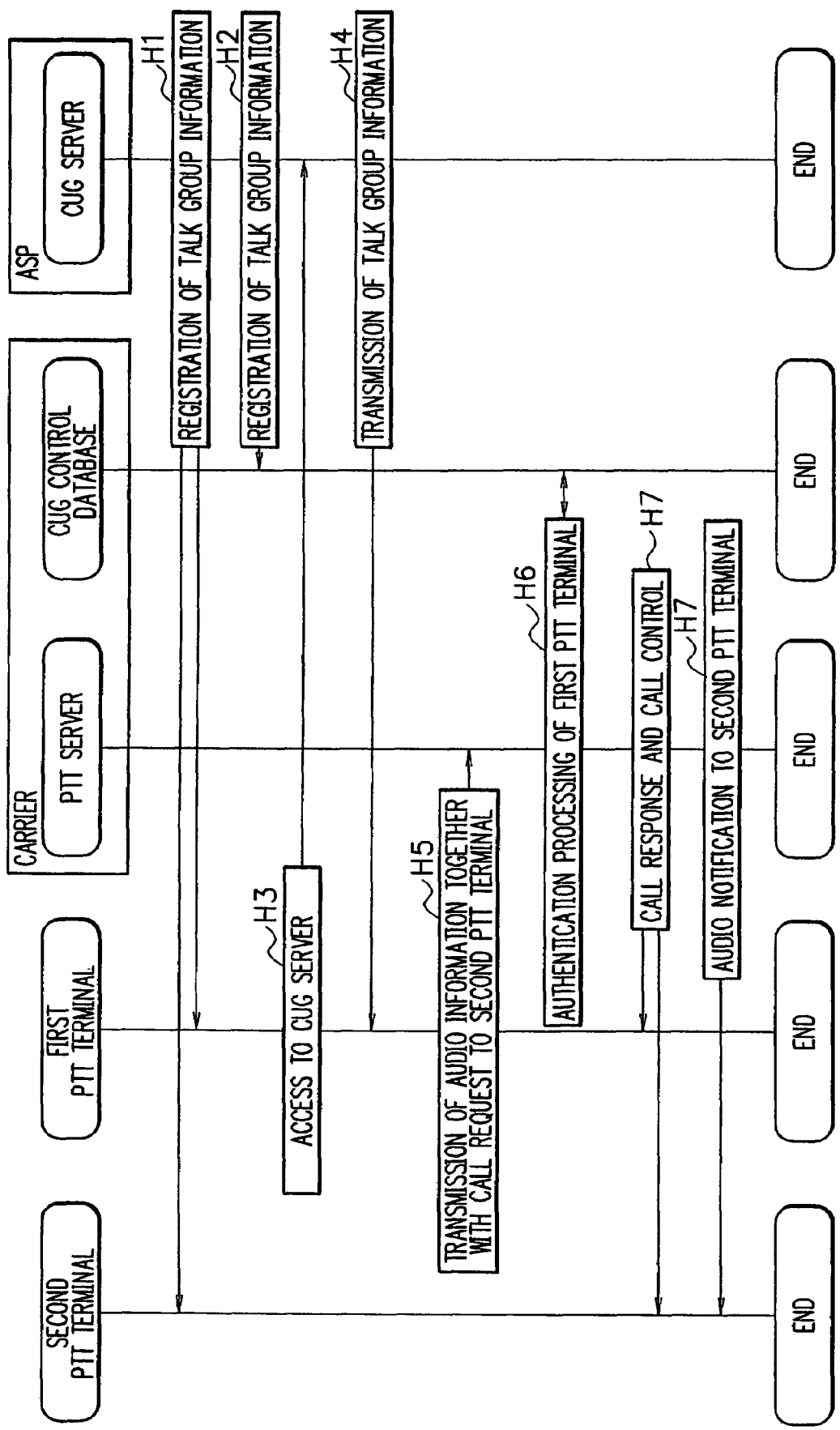

RADIO COMMUNICATIONS SYSTEM AND METHOD FOR RADIO COMMUNICATIONS

BACKGROUND OF THE INVENTION

1. Field of the Invention

The present invention relates to a radio communications system and a method for radio communications to implement radio communications processing between communication terminal devices using a press-talk switch, and in particular, to a radio communications system and a method for radio communications that employs so-called CUG (Closed User Group) in which radio communications processing are implemented only within a group consisting of a specified number of people. The press-talk switch is a communication method enabling a radio communications process with a communication counterpart by pushing down a predetermined operation button that is provided in a radio communication terminal device.

2. Description of the Related Art

A great number of services are implemented using radio communications. One of such services using radio communications is a wireless communications system that is constructed with PTT (Push To Talk).

For example, there is an iDEN® system utilizing an integrated digital wide area networks developed by Motorola Inc., as is described in MOTOROLA, "iDEN Technical Overview," [online], Aug. 8, 2000, Motorola Inc. Network Solution Sector [Sep. 12, 2003], the Internet. Download the Complete iDEN System Overview pdf (2.7Mb) (Chapter4: Dispatch Call Processing, 4-3: Dispatch Location Area, FIGS. 4-3 Simplified Dispatch Diagram). enhanced base transceiver device (EBTS) to implement half-duplex information communication using PTT (Push To Talk) between specific communication terminal devices grouped in advance, and transfers the audio information between user stations within a communication system. The PTT (Push To Talk) is a communication method with which a wireless communications with a communication counterpart is enabled by pushing down a specified operation button provided in a communication terminal device, and which is applicable to half-duplex transmission scheme.

In conventional radio communications systems with PTT, as shown in FIG. 1, a carrier that provides a radio communications system exclusively owns a PTT server (100) for establishing the radio communications processing among PTT communication terminal devices (1 to N), and a CUG server (200) for controlling the group information of communication terminal devices to perform radio communication among particular communication terminal devices (1 to N) with the PTT server (100) and the CUG server (200) connected to each other. A user can perform radio communication among particular PTT communication terminal devices (1 to N), only after a user of radio communication registers group information of PTT communication terminal devices (1 to N) in the CUG server (200) owned by the carrier providing a radio communications system using PTT, and pays the registration fee of radio communication in the group information to the carrier. This imposes limitation on the usage variations of radio communications and the price system of radio communications for users, and hence inhibits more users from using such a system.

In addition, as the market size base of various communications services are rapidly increasing, and a company such as ASPs (Application Service Provider), etc. needs to establish its own communication service to differentiate it from other companies' one and acquire more users. In fact, there exists in the market, potential users who would like around-the-clock use if they do not have to bear so much communications costs. A communication service for acquiring such users should be established.

The present invention is achieved to solve the above problems, and it is an object of the present invention to provide a radio communications system and a radio communications method that eliminate the limitation on the usage form of radio communications using a press-talk switch and enable users to easily perform radio communications processing.

SUMMARY OF THE INVENTION

According to an aspect of the present invention, in order to achieve the object mentioned above, there is provided a radio communication system comprising a plurality of communication terminal devices for performing radio communications with a press-talk switch, a server for establishing radio communication processing among the communication terminal devices, and a plurality of CUG servers for controlling the communication terminal devices for establishing the radio communication processing, the server and the CUG server respectively being owned by different companies, wherein the CUG server has group information storage means for making a group among particular communication terminal devices to implement radio communication with the press-talk switches, and storing group information where CUG identification information for identifying CUG servers is given to the made group, the communication terminal device has: radio communications group acquisition means for acquiring, from the CUG servers, the group information among particular communication terminal devices for implementing radio communication with the press-talk switches; and audio information notification requesting means for transmitting to the server, together with the group information, an audio information notification request for notifying audio information to a second communication terminal device in the group information acquired by the radio communications group acquisition means, and the server has radio communications establishment means for acquiring, on receipt of the audio information notification request from the communication terminal device, based on the CUG identification information in the group information received together with the audio notification request, the group information of the communication terminal device from the CUG server, establishing radio communication among the communication terminal devices in the acquired group information, and transmitting audio information to the second communication terminal device in the group information.

According to another aspect of the present invention, there is provided a radio communications system comprising a plurality of communication terminal devices for performing radio communications with a press-talk switch, a server for establishing radio communication processing among the communication terminal devices, a plurality of CUG servers for controlling the communication terminal devices for establishing the radio communication processing, and a CUG control database for controlling the CUG servers, the server and the CUG server respectively being owned by different companies, wherein the CUG server has: group information storage means for making a group among particular communication terminal devices to implement radio communication with the press-talk switches, and storing group information where CUG identification information for identifying CUG servers is given to the made group; and group information registration means for registering the group information stored by the group information storage means in the CUG control database, the communication terminal device has: radio communications group acquisition means for acquiring, from the CUG servers, the group information among particular communication terminal devices for implementing wireless communication with the press-talk switches; and audio information notification requesting means for transmitting to the server, together with the group information, an audio information notification request for notifying audio information to a second communication terminal device in the group information acquired by the radio communications group acquisition means, and the server has radio communications establishment means for acquiring, on receipt of the audio information notification request from the communication terminal device, based on the CUG identification information in the group information received together with the audio notification request, the group information of the communication terminal device from the CUG control database, establishing radio communication among the communication terminal devices in the acquired group information, and transmitting audio information to the second communication terminal device in the group information.

According to yet another aspect of the present invention, there is provided a radio communications system comprising a plurality of communication terminal devices for performing radio communications with a press-talk switch, a server for establishing radio communication processing among the communication terminal devices, and a plurality of CUG servers for controlling the communication terminal devices for establishing the radio communication processing, the server and the CUG server respectively being owned by different companies, wherein the CUG server has: group information storage means for making a group among particular communication terminal devices to implement radio communication with the press-talk switches, and storing group information where CUG identification information for identifying CUG servers is given to the made group; and authentication response transmission means for, on receipt of an authentication request of a communication terminal device from the server, determining whether or not information of the communication terminal device is stored in the group information stored by the group information storage means, and transmitting the authentication result to the server, the communication terminal device has: radio communications group acquisition means for acquiring, from the CUG servers, the group information among particular communication terminal devices for implementing radio communication with the press-talk switches; audio information notification requesting means for transmitting to the server, together with the group information, an audio information notification request for notifying audio information to a second communication terminal device in the group information acquired by the radio communications group acquisition means; and audio information transmission means for, on receipt of a response result that the audio information notification request is to be responded, from the server to which the audio information notification request has been transmitted with the audio information notification requesting means, transmitting to the server, audio information to the second communication terminal device; and the server has: authentication request transmission means for, on receipt of the audio information notification request from the communication terminal device, selecting the CUG server based on the CUG identification information in the group information received together with the audio information notification request, and transmitting an authentication request of the communication terminal device to the CUG server; audio information notification response means for, on receipt of an authentication result from the CUG server to which an authentication request has been transmitted by the authentication request transmission means, establishing radio communication among the communication terminal devices in the group information of the communication terminal devices in accordance with the authentication result, and transmitting to the communication terminal device a response result whether or not to respond to the audio information notification request received from the communication terminal device; and audio information relaying means for, on receipt of the audio information to the second communication terminal device from the communication terminal device, transmitting the received audio information to the second communication terminal device.

According to yet another aspect of the present invention, there is provided a radio communications system comprising a plurality of communication terminal devices for performing radio communications with a press-talk switch, a server for establishing radio communication processing among the communication terminal devices, a plurality of CUG servers for controlling the communication terminal devices for establishing the radio communication processing, and a CUG control database for controlling the CUG servers, the server and the CUG server respectively being owned by different companies, wherein the CUG server has: group information storage means for making a group among particular communication terminal devices to implement radio communication with the press-talk switches, and storing group information where CUG identification information for identifying CUG servers is given to the made group; and group information registration means for registering the group information stored by the group information storage means in the CUG control database, the communication terminal device has: radio communications group acquisition means for acquiring, from the CUG servers, the group information among particular communication terminal devices for implementing radio communication with the press-talk switches; audio information notification request means for transmitting to the server together with the group information, an audio information notification request for notifying audio information to a second communication terminal device in the group information acquired by the radio communications group acquisition means; and audio information transmission means for, on receipt of a response result that the audio information notification request is to be responded, from the server that has transmitted the audio information notification request with the audio information notification requesting means, transmitting to the server, audio information to the second communication terminal device, and the server has: audio information notification response means for, on receipt of an audio information notification request from the communication terminal device, determining whether or not information of the communication terminal devices is registered in the CUG control database based on CUG identification information in the group information received together with the audio information notification request, establishing radio communication among the communication terminal devices in the group information of the communication terminal devices in accordance with the determination result, and transmitting to the communication terminal device, a response result whether or not to respond to the audio information notification request received from the communication terminal device; and audio information relaying means for, on receipt of the audio information to the second communication terminal device from the communication terminal device, transmitting the received audio information to the second communication terminal device.

In the radio communication system according to the present invention, the communication terminal device may further have group information storage means for storing the group information acquired from the CUG server by the radio communication group acquisition means, and the audio information notification requesting means may transmit to the server, together with the group information, an audio information notification request for notifying audio information to the second communication terminal device in the group information stored by the group information storage means.

In the radio communication system according to the present invention, the radio communications group acquisition means may make connection with the CUG server, and acquire the group information from the CUG server, and the audio information notification requesting means may transmit to the server, together with the group information, an audio information notification request for notifying audio information to a second PTT communication terminal device in the group information acquired by connection to the CUG server.

In the radio communication system according to the present invention, the audio information notification response means: if the authentication result received from the CUG server to which the authentication request has been transmitted by the authentication request transmission means is an authentication result that information of the communication terminal device is stored in the group information stored by the group information storage means, may establish radio communication among the communication terminal devices in the group information of the communication terminal devices and transmit to the communication terminal device a response result that the audio information notification request is to be responded; and if the authentication result is an authentication result that information of the communication terminal device is not stored in the group information stored by the group information storage means, may not establish radio communication among the communication terminal devices in the group information of the communication terminal devices, and transmit to the communication terminal device, a response result that the audio information notification request is not be to be responded.

In the radio communication system according to the present invention, the audio information notification response means: if it is determined that the information of the communication terminal device is registered in the CUG control database, may establish radio communication among the communication terminal devices in the group information of the communication terminal devices, and transmit to the communication terminal device, a response result that the audio information notification request received from the communication terminal device is to be responded; and if it is determined that the information of the communication terminal device is not registered in the CUG control database, may not establish radio communication among the communication terminal devices in the group information of the communication terminal devices, and transmit to the communication terminal device a response result that the audio information notification request received from the communication terminal device is not to be responded.

In the radio communication system according to the present invention, the communication terminal device may further have: audio information simultaneous notification requesting means for transmitting to the server, audio information to the second communication terminal device, together with an audio information notification request for notifying audio information to the second communication terminal device in the group information acquired from the CUG server, and the server may further have: audio information simultaneous transmission means for transmitting to the second communication terminal device, the audio information received together with the audio information notification request from the communication terminal device.

In the radio communication system according to the present invention, the second communication terminal device in the group information may be at least one of communication terminal devices in the group information, and the communication terminal device may further have second communication terminal device setting means for selecting at least one of communication terminal devices in the group information and setting the second communication terminal device in the group information.

In the radio communication system according to the present invention, the audio information simultaneous transmission means: if the authentication result received from the CUG server is an authentication result that information of the communication terminal device is stored in the group information stored by the group information storage means, may establish radio communication among the communication terminal devices in the group information of the communication terminal devices, and transmit to the second communication terminal device the audio information received together with the audio information notification request from the communication terminal device.

In the radio communication system according to the present invention, the audio information simultaneous transmission means: if it is determined that the information of the communication terminal device is registered in the CUG control database, may establish radio communication among the communication terminal devices in the group information of the communication terminal devices, and transmit to the second communication terminal device the audio information received together with the audio information notification request from the communication terminal device.

According to another aspect of the present invention, there is provided a radio communications method implemented with a radio communications system comprising a plurality of communication terminal devices for performing radio communication with a press-talk switch, a server for establishing radio communication processing among the communication terminal devices, and a plurality of CUG servers for controlling the communication terminal devices for establishing the radio communication, the server and the CUG server respectively being owned by different companies, the method comprising: a group information registration step of, by the CUG server, making a group among particular communication terminal devices to implement radio communication with the press-talk switches, and registering group information where CUG identification information for identifying CUG servers is given to the made group, in a storage section of the CUG server; an audio information notification requesting step of, by a first communication terminal device, acquiring the group information from the CUG server, and transmitting to the server, together with the group information, an audio information notification request for notifying audio information to a second communication terminal device in the acquired group information; and a radio communications establishment step of, by the server, acquiring, on receipt of the audio information notification request from the first communication terminal device, based on the CUG identification information in the group information received together with the audio notification request, the group information of the first communication terminal device from the CUG control database, establishing radio communication among the communication terminal devices in the acquired group information, and transmitting audio information to the second communication terminal device in the group information.

According to another aspect of the present invention, there is provided a radio communications method implemented with a radio communications system comprising a plurality of communication terminal devices for performing radio communication with a press-talk switch, a server for establishing radio communication among the communication terminal devices, a plurality of CUG servers for controlling the communication terminal devices for establishing the radio communication processing, and a CUG control database for controlling the CUG servers, the server and the CUG server respectively being owned by different companies, the method comprising: a group information registration step of, by the CUG server, making a group among particular communication terminal devices to implement radio communication with the press-talk switches, and registering group information where CUG identification information for identifying CUG servers is given to the made group, in a storage section of the CUG server; a second group information registration step of, by the CUG server, registering the group information registered in the storage section, in the CUG control database; an audio information notification requesting step of, by a first communication terminal device, acquiring the group information from the CUG server, and transmitting to the server, together with the group information, an audio information notification request for notifying audio information to a second communication terminal device in the acquired group information; and a radio communications establishment step of, by the server, acquiring, on receipt of the audio information notification request from the first communication terminal device, based on the CUG identification information in the group information received together with the audio notification request, the group information of the first communication terminal device from the CUG control database, establishing radio communication among the communication terminal devices in the acquired group information, and transmitting audio information to the second communication terminal device in the group information.

According to yet another aspect of the present invention, there is provided a radio communications method implemented with a radio communications system comprising a plurality of communication terminal devices for performing radio communication with a press-talk switch, a server for establishing radio communication among the communication terminal devices, a plurality of CUG servers for controlling the communication terminal devices for establishing the radio communication, the server and the CUG server respectively being owned by different companies, the method comprising: a group information registration step of, by the CUG server, making a group among particular communication terminal devices to implement radio communication with the press-talk switches, and registering group information where CUG identification information for identifying CUG servers is given to the made group, in a storage section of the CUG server; an audio information notification requesting step of, by a first communication terminal device, acquiring the group information from the CUG server, and transmitting to the server, together with the group information, an audio information notification request for notifying audio information to a second communication terminal device in the acquired group information; an authentication request transmission step of, by the server, on receipt of the audio information notification request from the first communication terminal device, selecting the CUG server based on the CUG identification information in the group information received together with the audio information notification request, and transmitting an authentication request of the first communication terminal device to the CUG server; an authentication response transmission step of, by the CUG server, on receipt of an authentication request of the first communication terminal device from the server, determining whether or not information of the first communication terminal device is registered in the group information registered in the storage section by the group information registration step, and transmitting the authentication result to the server; an audio information notification response step of, by the server, on receipt of an authentication result from the CUG server, establishing radio communication among the communication terminal devices in the group information of the communication terminal devices in accordance with the authentication result, and transmitting to the first communication terminal device a response result whether or not to respond to the audio information notification request received from the first communication terminal device; an audio information transmission step of, by the first communication terminal device, on receipt of the response result from the server, if the response result is an response result that the audio information notification request is to be responded, transmitting to the server, audio information to the second communication terminal device; and an audio information relaying step of, by the server, on receipt of the audio information to the second communication terminal device, transmitting the received audio information to the second communication terminal device.

According to yet another aspect of the present invention, there is provided a radio communications method implemented with a radio communications system comprising a plurality of communication terminal devices for performing radio communication with a press-talk switch, a server for establishing radio communication processing among the communication terminal devices, a plurality of CUG servers for controlling the communication terminal devices for establishing the radio communication, and a CUG control database for controlling the CUG servers, the server and the CUG server respectively being owned by different companies, the method comprising: a first group information registration step of, by the CUG server, making a group among particular communication terminal devices to implement radio communication with the press-talk switches, and registering group information where CUG identification information for identifying CUG servers is given to the made group, in a storage section of the CUG server; a second group information registration step of, by the CUG server, registering the group information registered in the storage section, in the CUG control database; an audio information notification requesting step of, by a first communication terminal device, acquiring the group information from the CUG server, and transmitting to the server, together with the group information, an audio information notification request for notifying audio information to a second communication terminal device in the acquired group information; an audio information notification response step of, by the server, on receipt of the audio information notification request from the first communication terminal device, determining whether or not information of the communication terminal devices is registered in the CUG control database based on CUG identification information in the group information received together with the audio information notification request, establishing radio communication among the communication terminal devices in the group information of the first communication terminal devices in accordance with the determination result, and transmitting to the first communication terminal device, a response result whether or not to respond to the audio information notification request received from the first communication terminal device; an audio information transmission step of, by the first communication terminal device, on receipt of the response result from the server, if the response result is a response result that the audio information notification request is to be responded, transmitting to the server, audio information to the second communication terminal device; and an audio information relaying step of, by the server, on receipt of the audio information to the second communication terminal device, transmitting the received audio information to the second communication terminal device.

In the radio communication method according to the present invention, in the audio information notification requesting step, the first communication terminal device may store the group information acquired from the CUG server in a storage section of the first communication terminal device, and transmit to the server together with the group information, an audio information notification request for notifying audio information to the second communication terminal device in the stored group information.

In the radio communication method according to the present invention, in the audio information notification requesting step, the first communication terminal device may access the CUG server, acquire the group information from the CUG server, and transmit to the server together with the group information, an audio information notification request for notifying audio information to the second communication terminal device in the acquired group information.

In the radio communication method according to the present invention, in the audio information notification response step: if the authentication result that the server has received from the CUG server is an authentication result that the information of the first communication terminal device is registered in the group information registered in the CUG server, the server may establish radio communication among communication terminal devices in the group information of the first communication terminal device, and transmit to the first communication terminal device, a response result that the audio information notification request is to be responded; and if the authentication result is an authentication result that the information of the first communication terminal device is not registered in the group information registered in the CUG server, the server may not establish radio communication among communication terminal devices in the group information of the first communication terminal device, and transmit to the first communication terminal device, a response result that the audio information notification request is not to be responded.

In the radio communication method according to the present invention, in the audio information notification response step: if it is determined that the information of the first communication terminal device is registered in the CUG control database, the server may establish radio communication among communication terminal devices in the group information of the first communication terminal device, and transmit to the first communication terminal device, a response result that the audio information notification request received from the first communication terminal device is to be responded; and if it is determined that the information of the first communication terminal device is not registered in the CUG control database, the server may not establish radio communication among communication terminal devices in the group information of the first communication terminal device, and transmit to the first communication terminal device, a response result that the audio information notification request received from the first communication terminal device is not to be responded.

The radio communication method according to the present invention may further comprise: an audio information simultaneous notification requesting step of, by the first communication terminal device, transmitting to the server together with an audio information notification request for notifying audio information to the second communication terminal device in the group information acquired by the CUG server, the audio information to the second communication terminal device, and an audio information simultaneous transmission step of, by the server, transmitting to the second communication terminal device, the audio information received together with the audio information notification request from the first communication terminal device.

In the radio communication method according to the present invention, the second communication terminal device in the group information may be at least one of communication terminal devices in the information group, and the method may comprise a step of, by the first communication terminal device, selecting at least one of communication terminal devices in the group information, and the first communication terminal device may set the second communication terminal device in the group information.

In the radio communication method according to the present invention, in the audio information simultaneous transmission step, if the authentication result that the server has received from the CUG server is an authentication result that the information of the first communication terminal device is registered in the group information registered in the CUG server, the server may transmit to the second communication terminal device, the audio information that the server has received together with the audio information notification request from the first communication terminal device.

In the radio communication method according to the present invention, in the audio information simultaneous transmission step, if the server determines that the information of the first communication terminal device is registered in the CUG control database, the server may transmit to the second communication terminal device, the audio information received together with the audio information notification request from the first communication terminal device.

The radio communications system and the radio communications method according to the present invention comprises a plurality of communication terminal devices for performing radio communication with a press-talk switch, a server for establishing radio communication processing among the communication terminal devices, a CUG servers for controlling the communication terminal devices for establishing the radio communication processing, the server and the CUG servers being respectively owned by different companies; the CUG servers make a group among particular communication terminal devices for implementing radio communications with a press-talk switch, and register in a storage section of the CUG servers, group information where CUG identification information for identifying CUG servers is given to the made group; the first communication terminal device acquires the group information from the CUG server, transmits to the server together with the group information, the audio information notification request for notifying the audio information to the second communication terminal device in the acquired group information; the server, on receipt of an audio information notification request from the first communication terminal device, acquires from the CUG server the group information of the first communication terminal device, based on the CUG identification information in the group information received together with the audio information notification request, establishes radio communication among communication terminal devices in the acquired group information, and transmits the audio information to the second communication terminal device in the group information, thereby registering in a particular CUG server the group information for implementing radio communication among particular communication terminal devices, and allowing users having communication terminal devices to perform radio communication among communication terminal devices in the group information, so as to eliminate the limitation on the usage form of radio communication with a press-talk switch and to enable users to perform radio communication processing easily. In addition, the server for establishing radio communication among communication terminal devices and the CUG server for registering the group information are respectively held by different companies so that the company owning CUG servers pay the registration fees for radio communications among communication terminal devices in the group information to the company owning the servers for establishing radio communication among communication terminal devices, thereby enabling users to utilize free of charge, radio communication service among communication terminal devices in the group information, and eliminating the limitation on the usage forms of radio communication as well as on the charging system.

BRIEF DESCRIPTION OF THE DRAWINGS

FIG. 12 is a sequence chart showing operation in a radio communications system of the Embodiment 7 according to the present invention; and FIG. 13 is a sequence chart showing operation in a radio communications system of the Embodiment 8 according to the present invention.

DETAILED DESCRIPTION OF THE PREFERRED EMBODIMENTS

Figure 1:
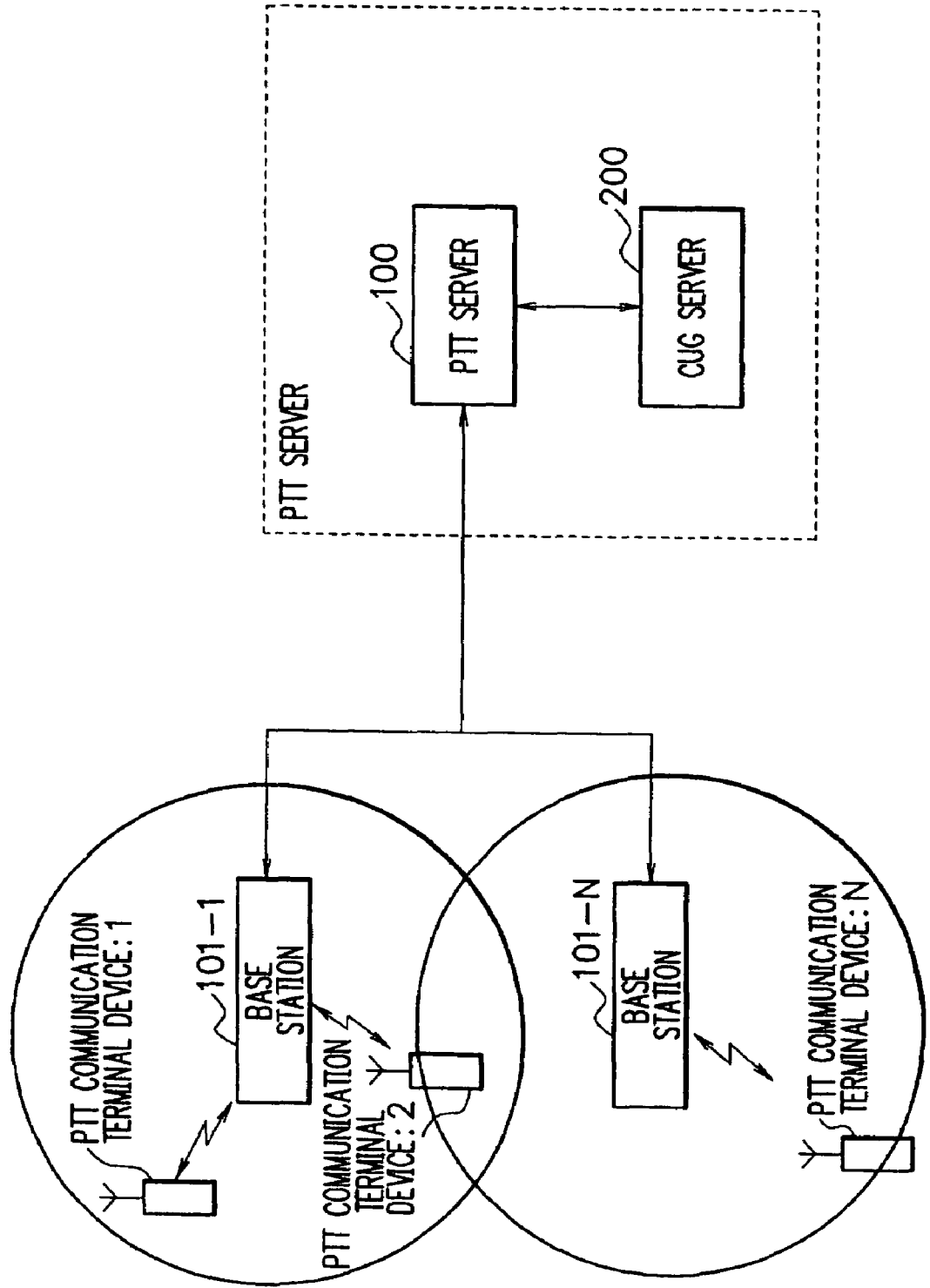
FIG. 1 shows a system configuration of a prior art radio communications system.

A radio communications system and a radio communications method according to the present invention is characterized in that CUG (Closed User Group) servers (200-1 to N (N is any integer)) of communication carriers are provided to the company such as outside ASP (Application Service Provider), etc., and group information of PTT communication terminal devices for performing radio communication processing among particular PTT communication terminal devices (1 to N (N is any integer)) is registered in the CUG servers (200-1 to N) provided outside, thereby controlling the PTT communication terminal devices (1 to N). The radio communications system comprises a plurality of PTT communication terminal devices (1 to N) for performing radio communication with a PTT (press-talk switch), a PTT server (100) for establishing radio communication processing among the PTT communication terminal devices (1 to N), and the CUG servers (200-1 to N) for controlling the PTT communication terminal devices (1 to N) for establishing the radio communication processing. The PTT server (100) and CUG servers (200-1 to N) are respectively owned by different companies. The CUG servers (200-1 to N) make a group for particular PTT communication terminal devices (1 to N) for implementing radio communication with a press-talk switch, and register, in a storage section of the CUG servers (200-1 to N), group information containing CUG identification information for identifying CUG servers (200-1 to N) provided to the made group. The first PTT communication terminal devices (1 to N) acquire group information from the CUG servers (200-1 to N), and transmit to the PTT server (100) an audio information notification request together with the group information in order to deliver the audio information to the second PTT communication terminal devices (1 to N) in the acquired group information. The PTT server (100), on receipt of an audio information notification request from the first PTT communication terminal devices (1 to N), acquires from the CUG servers (200-1 to N) the group information of the first PTT communication terminal devices (1 to N), based on the CUG identification information in the group information received together with the audio information notification request, establishes radio communications among communication terminal devices (1 to N) in the acquired group information, and transmits the audio information to the second PTT communication terminal devices (1 to N) in the group information.

Embodiment 1

An embodiment according to the present invention will be described with reference to the appended drawings as follows.

At first, a system configuration of a radio communications system according to the present invention will be described with reference to FIG. 2.

The radio communications system according to the present invention is equipped with a transceiver function, and comprises PTT communication terminal devices (1 to N (N is any integer)) for performing wireless communication with PTT (Press Talk Switch), a PTT server (100) for establishing radio communication processing among the PTT communication processing among the PTT communication terminal devices (1 to N), and CUG servers (200-1 to 200-N

(N is any integer)) for controlling a group of PTT communication terminal devices to implement radio transmission processing through the PTT server 100.

The PTT communication terminal devices (1 to N) are transmission terminal devices for implementing radio communication processing among the PTT communication terminal devices by pushing down a predetermined button (Press Talk Switch) in the PTT communication terminal devices.

Figures 3, 4:
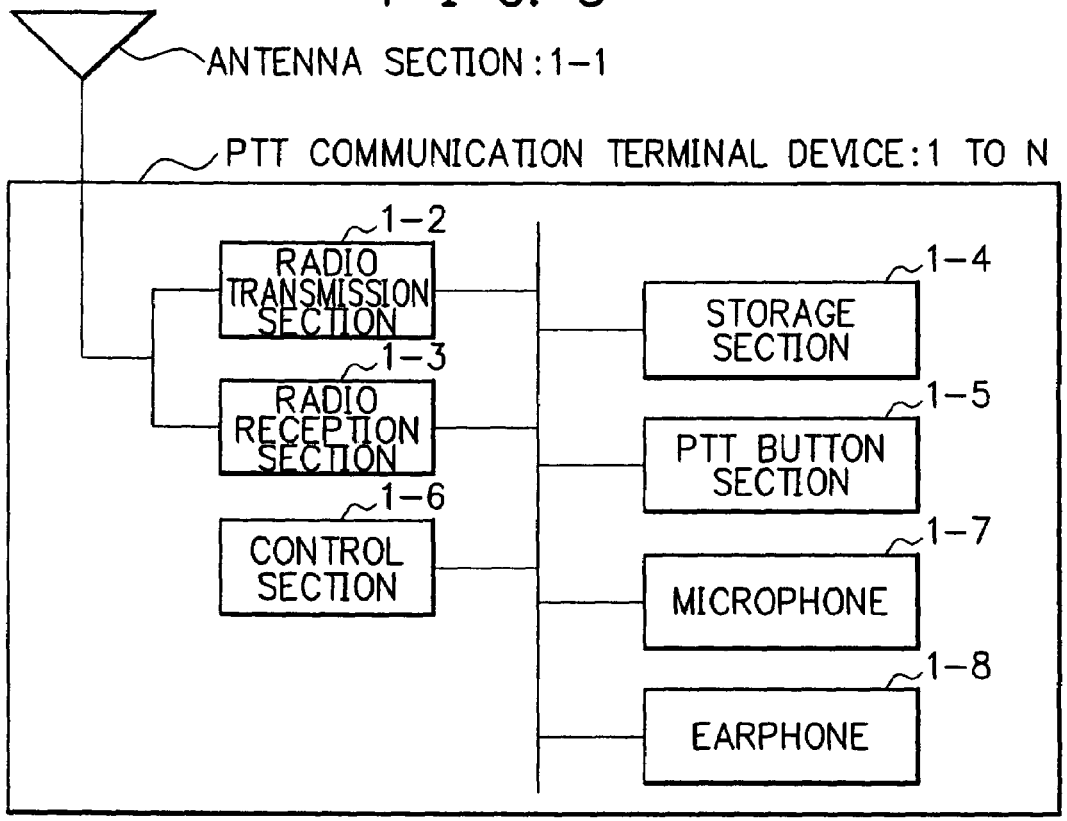
FIG. 3 is a block diagram showing a functional configuration of PTT communication terminal devices of a radio communications system according to the present invention.
FIG. 4 is an image diagram showing Talk group information to allow radio communication processing among particular PTT communication terminal devices.

A PTT communication terminal device (1 to N) comprises, as shown in FIG. 3, an antenna section (1-1), a radio transmission section (1-2), a radio reception section (1-3), a storage section (1-4), a press talk switch or PTT button section (1-5), a control section (1-6), a microphone (1-7), and an earphone (1-8).

The storage section (1-4) is a section to store Talk group information for implementing radio communication among particular PTT communication terminal devices. Radio communication processing is implemented among the PTT communication terminal devices registered in this Talk group information. This Talk group information is acquired and stored information that is prepared and registered in the CUG server (200-1 to 200-N) in the outside. This Talk group information comprises, as shown in FIG. 4, CUG identification information for identifying a CUG server where the Talk group information is registered, Talk group identification information for identifying Talk group information to establish radio communications among PTT communication terminal devices, PTT communication terminal identification information for identifying PTT communication terminal device that establishes radio communication processing in the Talk group information, and available period information describing a period of validity when radio communication can be established using the Talk group information.

In order to transmit audio information to a PTT communication terminal device in the Talk group information stored in the storage section (1-4) using the PTT communication terminal device shown in FIG. 3, the press talk switch (1-5) is pushed down so that the audio information acquired by the microphone (1-7) is inputted to the radio transmission section (1-2), and transmitted from the antenna section (1-1) subject to modulation for radio communication. In addition, as for the audio information transmitted from an outside PTT communication terminal device, the audio information inputted through the radio reception section (1-3) is outputted from the earphone (1-8).

Figure 2:
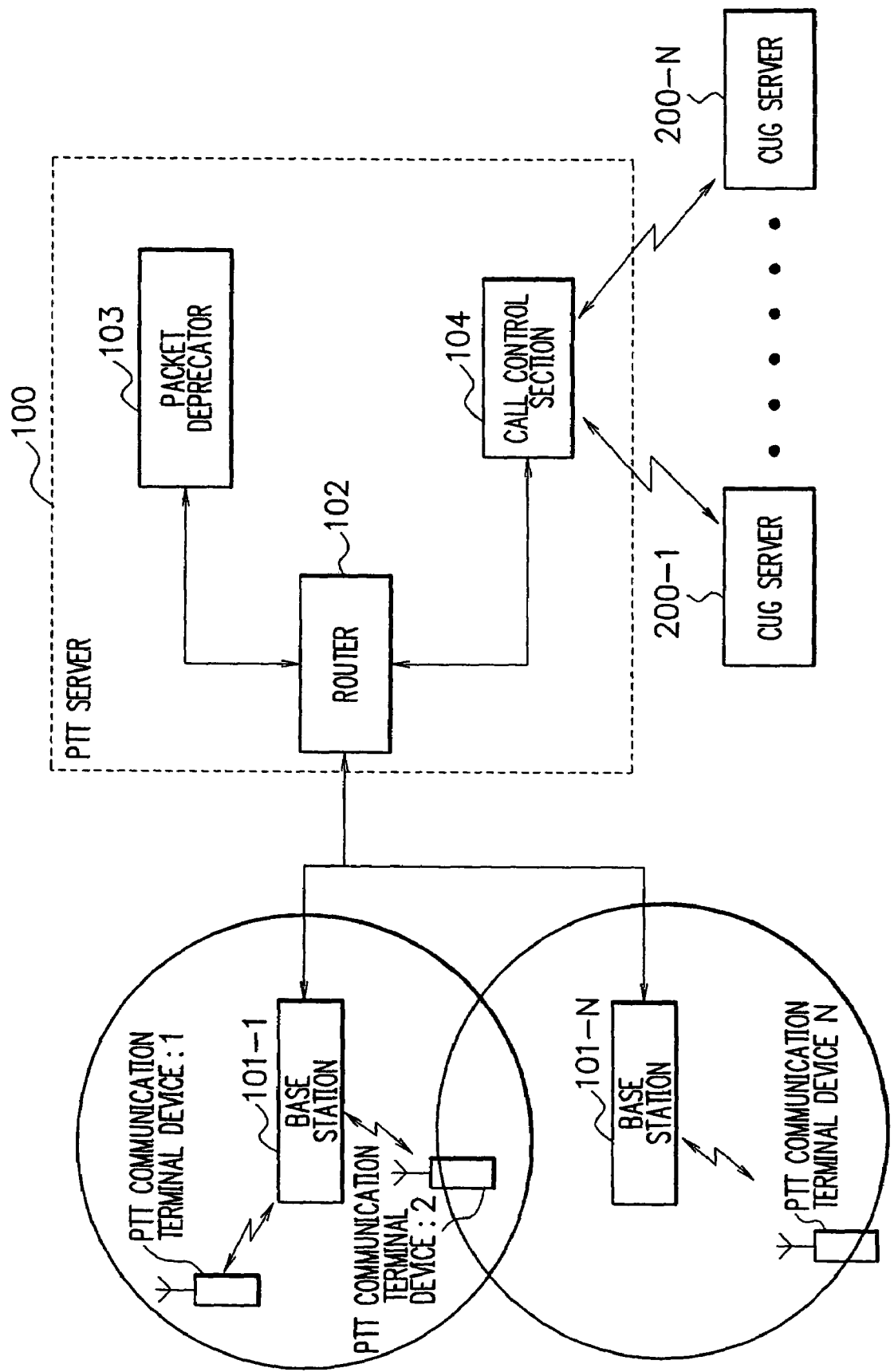
FIG. 2 shows a system configuration of a radio communications system according to the present invention.

The PTT server (100) is an information processing device for establishing processing of radio communications among the PTT communication terminal devices (1 to N), and comprises, as shown in FIG. 2, a router (102), a packet deprecator (103), and a call control section (104). Talk group information transmitted from the PTT communication terminal devices (1 to N) is transmitted to the router (102) via a base station (101). The router (102) transmits the Talk group information to the call control section (104). The call control section (104) selects the CUG servers (200-1 to 200-N) in the outside based on identification information of the CUG servers included in the Talk group information, and authentication processing for PTT communication terminal devices is implemented in that selected CUG server (200-1 to 200-N) so that call control among the PTT communication terminal devices in the Talk group information is established thereby establishing radio communication processing among PTT communication terminal devices in the Talk group information. In addition, audio information transmitted from the PTT communication terminal devices (1 to N) is transmitted to the router (102) via the base station (101), then the router (102) transmits the audio information to the packet deprecator (103), and in the packet deprecator (103) the audio information is duplicated thereby making audio information to be transmitted to the PTT communication terminal devices (1 to N) in the Talk group information with radio communication processing established, and the made audio information is transmitted to the PTT communication terminal devices (1 to N) in the Talk group information. Note that the system configuration in FIG. 2 has been described as a configuration with a router (102) being provided in the PTT server (100), but the configuration inside the PTT server (100) is not be limited thereto, but the radio communication system according to the present invention can be embodied without provision of a router (102), and the configuration inside the PTT server is not be limited in particular but can be embodied with various changes.

The CUG servers (200-1 to 200-N) are information processor for controlling the group of PTT communication terminal devices (1 to N) that implement radio communications via the PTT server (100). The CUG servers (200-1 to 200-N) make the Talk group information shown in FIG. 4 in the CUG server (100-1 to 200-N) to register and control the Talk group information in the storage section of the CUG servers (200-1 to 200-N). Processing of making the Talk group information will be described as follows.

(Method for Making Talk Group Information)

At first, in a CUG server, CUG identification information for identifying the CUG server is registered.

Next, the Talk group identification information to be the Talk group name for identifying the Talk group information is registered.

Next, PTT communication terminal identification information in order to identify the PTT communication terminal to establish a particular radio communication processing is registered based on the Talk group information.

Next, available period information (for example, one day, one week, and unlimited period, etc.) that enables radio communications processing, is registered based on the Talk group information.

Thereby, the Talk group information as shown in FIG. 4 is made and the Talk group information is registered in the storage section of the CUG server. In addition, the PTT communication terminal device acquires the Talk group information from the CUG servers to register the acquired Talk group information in the storage section of the PTT communication terminal devices.

When registering the identification information of a PTT communication terminal device can be implemented by manual input, or the identification information of PTT communication terminal devices can be registered with short distance radio communication (infrared data communication and non-contact communication, etc.) from the PTT communication terminal devices. In addition, available period information can be registered by manual input, or available period information set in the CUG servers in advance can be registered, and the method for making this Talk group information can be made with appropriate changes with known technologies without particular limitation.

(Processing Operation in Radio Communications System)

Figure 5:
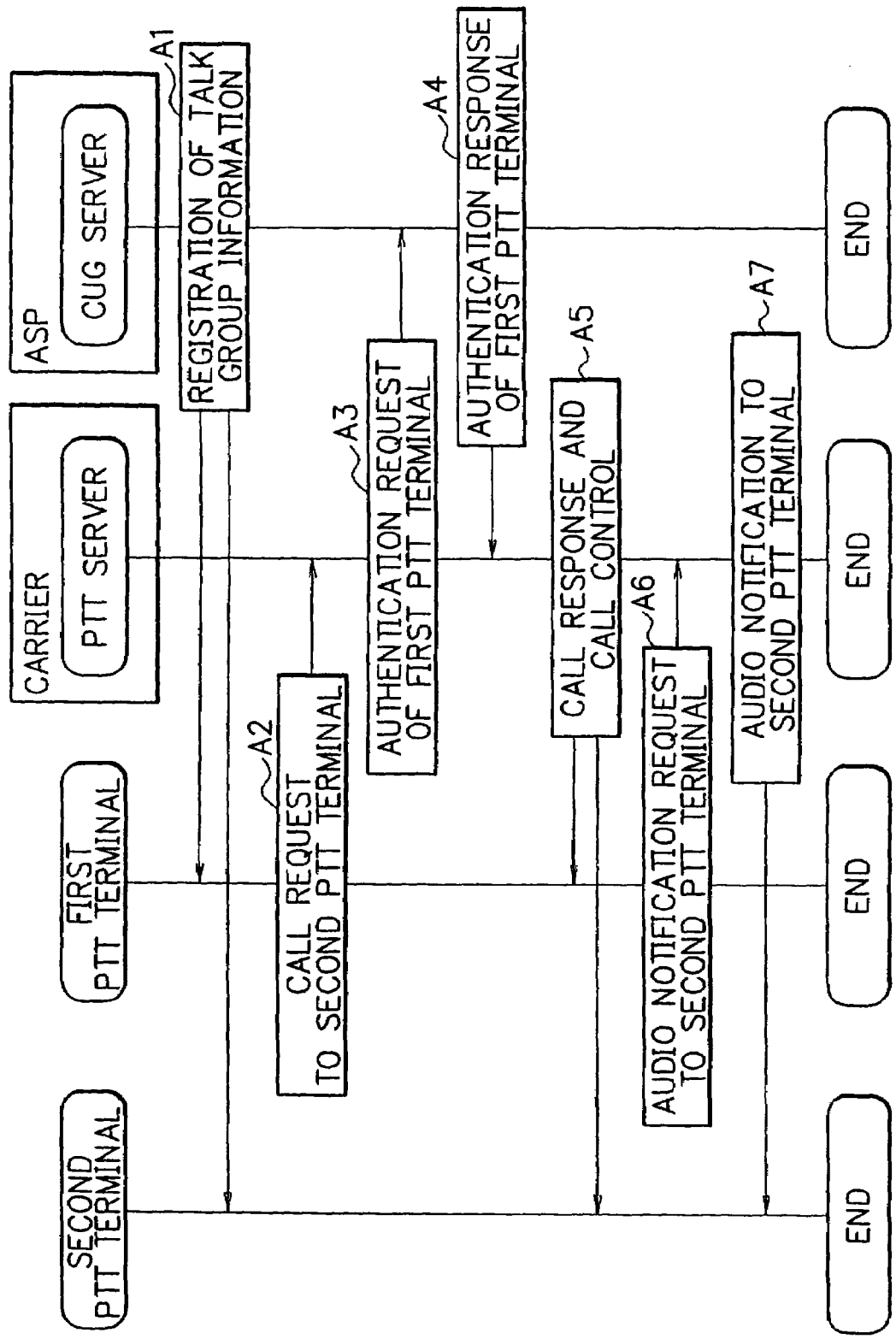
FIG. 5 is a sequence chart showing operation in a radio communications system of the Embodiment 1 according to the present invention.

Next, the processing operation in radio communications system configured as described above will be described with reference to FIG. 5.

At first, Talk group information is registered in the storage section of the CUG servers, and the Talk group information is stored in the storage section of the first PTT communication terminal device (Step A1).

Next, the first PTT communication terminal device makes a call request to the second PTT communication terminal device with the Talk group information stored in the storage section of the first PTT communication terminal device (Step A2).

At this time, a particular operation button (press-talk switch) of the first PTT communication terminal device is pushed down, which causes the PTT server to make a call request toward the second PTT communication terminal device, and also causes the Talk group information stored in the storage section of the first PTT communication terminal device to be transmitted to the PTT server.

Next, the PTT server, after receiving the call request from the first PTT communication terminal device to the second PTT communication terminal device, transmits an authentication request of the first PTT communication terminal device to the CUG server in order to determine whether or not to respond to that call request (Step A3).

At this time, the PTT server determines the CUG server to be the destination of the authentication request based on the identification information of the CUG server included in the Talk group information that is received from the first PTT communication terminal device together with the call request, and transmits the authentication request of the first PTT communication terminal device to the determined CUG server and transmits the Talk group information received from the first PTT communication terminal device.

The CUG server that received the authentication request of the first PTT communication terminal device determines whether or not the identification information of the first PTT communication terminal device included in the Talk group information received together with the authentication request of the first PTT communication terminal device is registered in the Talk group information registered in the storage section of the CUG server, and perform authentication of the first PTT communication terminal device. In addition, when the authentication processing of the first PTT communication terminal device is completed, the CUG server transmits that authentication result to the PTT server (Step A4).

The PTT server on receipt of authentication results from the CUG server determines whether or not to respond to the call request to the second PTT communication terminal device based on that received authentication results. If the authentication result received from the CUG server is a determination result that the identification information of the first PTT communication terminal device is registered in the Talk group information, the PTT server responds to the call request to the second PTT communication terminal device. Specifically, the PTT server acquires from the CUG server and temporally hold the Talk group information containing the identification information of the first PTT communication terminal device to establish call control of the radio communication processing among the PTT communication terminal devices in the Talk group information containing the identification information of the first PTT communication terminal device, and to transmit to the first PTT communication terminal device the authentication result that the call request to the second PTT communication terminal device is to be responded. In addition, the PTT server transmits to the second PTT communication terminal device with notification that call control of radio communication processing among the PTT communication terminal devices in Talk group information has been established (Step A5).

Note that, in order that the PTT server establishes the call control of the radio communication processing among the PTT communication terminal devices in the Talk group information containing the identification information of the first PTT communication terminal device, the CUG server may transmit to the PTT server the Talk group information containing the identification information of the first PTT communication terminal device if the CUG server has determined that the identification information of the first PTT communication terminal device has been registered in the Talk group information.

In addition, if the authentication result received from the CUG server is a determination result that the identification information of the first PTT communication terminal device is not registered in the Talk group information, the call request to the second PTT communication terminal device is not responded. Specifically, call control of the radio communication processing among the PTT communication terminal devices in the Talk group information containing the identification information of the first PTT communication terminal device is established, and the authentication result that the call request to the second PTT communication terminal device is not to be responded is transmitted to the first PTT communication terminal device (Step A5).

Next, if the authentication result received from the CUG server is an authentication result that the call request to the second PTT communication terminal device is to be responded, the audio information is notified to the second PTT communication terminal device, and an audio notification request for notifying to the second PTT communication terminal device acquired from the microphone of the first PTT communication terminal device together with the audio information is transmitted to the PTT server (Step A6).

The PTT server, for which the call control has been established, receives the audio notification request from the first PTT communication terminal device, and then transmits the audio information received together with the audio notification request to the second PTT communication terminal device (Step A7). This causes the audio information received at the second PTT communication terminal device from the PTT server to be outputted from the speaker of the second PTT communication terminal device so that the user of the second PTT communication terminal device can hear the speech from the user of the first PTT communication terminal device.

As described above, the Talk group information for establishing PTT communication processing among particular PTT communication terminal devices is registered in the CUG server; and when audio information is transmitted from the first PTT communication terminal device to the second PTT communication terminal device, the first PTT communication terminal device undergoes authentication processing of the first PTT communication terminal device based on the Talk group information registered in the CUG server, and call control of radio communication processing among the PTT communication terminal devices in the Talk group information containing the first PTT communication terminal device is established by the PTT server. This enables notification of the audio information to the second PTT communication terminal device registered in the established Talk group. It should be noted that a user performing radio communication processing, after registering the Talk group information into the CUG server, is allowed to implement audio calls through radio communication without paying of registration fee to the carrier owning the PTT server for the communication processing, and that the registration fee for the radio communication processing is paid to the carrier by a company such as ASP, owning CUG servers. Accordingly, without paying registration fee for the registration of the Talk group information to the CUG server to permit the radio communication processing, and the company such as ASP can effectively acquire more users.

Talk group information to be registered in the CUG server includes available period information to enable radio communication so that, if it is determined that the available period to enable radio communication has been expired at the time when the CUG server performs authentication processing of the PTT communication terminal device, the notification indicating that radio communication is not available is transmitted to the PTT communication terminal device to control the PTT communication terminal device for radio communication. The control of the PTT communication terminal device to enable radio communication can also performed by the CUG server deleting the Talk group information in which available period to enable radio communication has been expired.

In addition, the second PTT communication terminal device to which the first PTT communication terminal device transmits audio information can be selected among PTT communication terminal devices in the Talk group information for transmission, and for example, a second PTT communication terminal device to which the audio information is transmitted is selected among the Talk group information in the display section of the first PTT communication terminal device, and the audio information is transmitted only to the selected second PTT communication terminal device. Instead of this selecting operation, automatic setting is also feasible to make automatic setting for transmission to all the PTT communication terminal devices in the Talk group information.

Embodiment 2

Next, the second Embodiment will be described.

Figure 6:
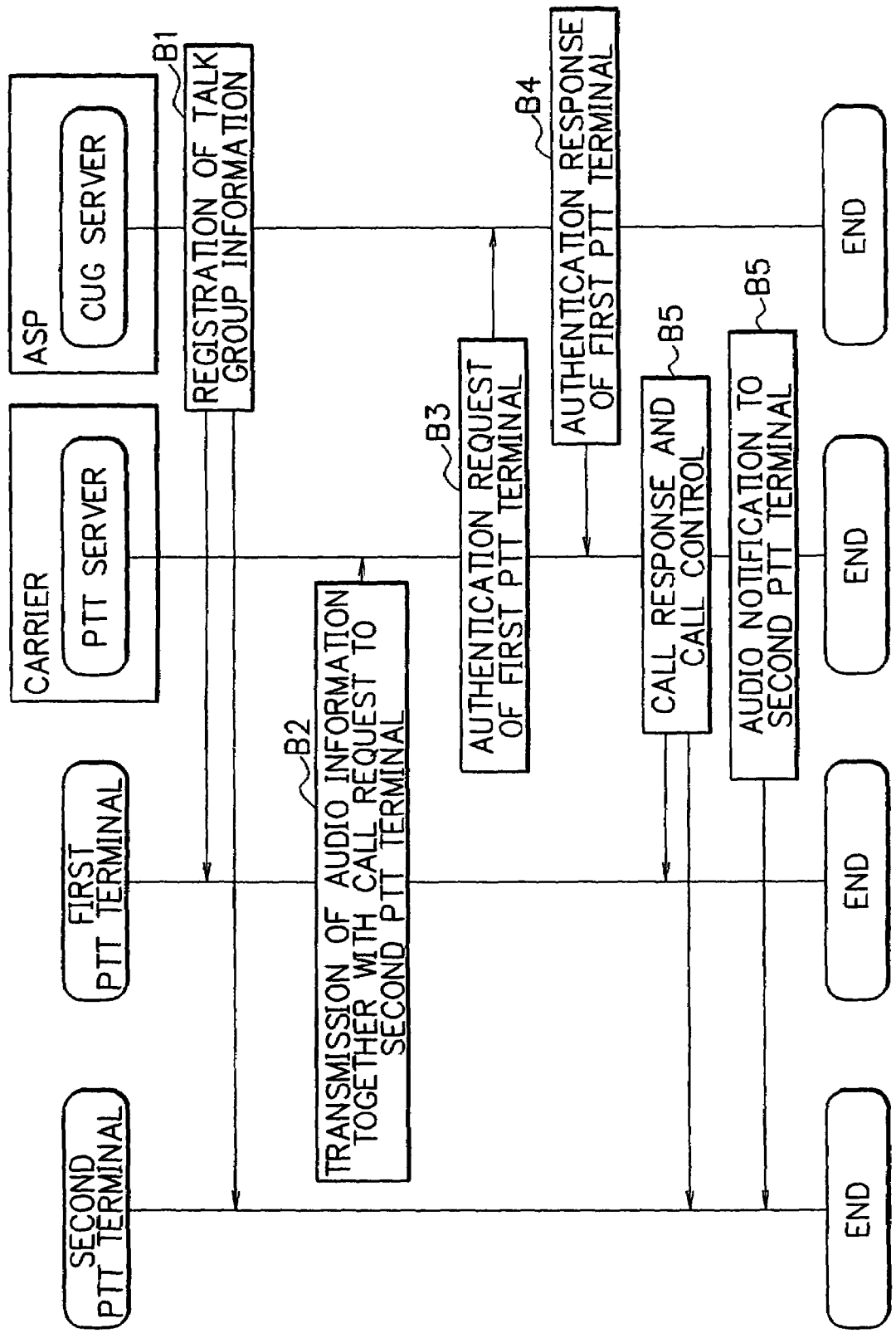
FIG. 6 is a sequence chart showing operation in a radio communications system of the Embodiment 2 according to the present invention.

The second embodiment is characterized in that audio information to be transmitted to a second PTT communication terminal device is simultaneously transmitted to a PTT server together with a call request to the second PTT communication terminal device. This can simplify processing performed until audio information is transmitted to the second PTT communication terminal device since transmission of audio information to the second PTT communication terminal device is not required after completion of authentication of the first PTT communication terminal device. The radio communication processing in the second embodiment will be described with reference to FIG. 6.

At first, the Talk group information is registered in a storage section of a CUG server and the Talk group information is also stored in a storage section of the first PTT communication terminal device (Step B1).

Next, at the time when the operation button (press-talk switch) of the first PTT communication terminal device is pushed down, the first PTT communication terminal device makes, to the PTT server, a call request to the second PTT communication terminal device and transmits, to the PTT server, the Talk group information stored in the storage section of the first PTT communication terminal device. In addition, the audio information acquired through a microphone of the first PTT communication terminal device is transmitted to the PTT server (Step B2).

Next, the PTT server that has received the call request from the first PTT communication terminal device to the second PTT communication terminal device transmits an authentication request of the first PTT communication terminal device and the Talk group information to the CUG server in order to determine whether or not to respond to that call request (Step B3). In addition, the CUG server that received the authentication request of the first PTT communication terminal device determines whether or not the identification information of the first PTT communication terminal device included in the Talk group information received together with the authentication request of the first PTT communication terminal device is registered in the Talk group information registered in the storage section of the CUG server, and performs authentication of the first PTT communication terminal device. In addition, when the authentication processing of the first PTT communication terminal device has been completed, the CUG server transmits that authentication result to the PTT server (Step B4).

The PTT server, upon receipt of authentication results from the CUG server, determines whether or not to respond to the call request to the second PTT communication terminal device based on that received authentication results. If the authentication result received from the CUG server is a determination result that the identification information of the first PTT communication terminal device is registered in the Talk group information, the PTT server responds to the call request to the second PTT communication terminal device. Specifically, the PTT server acquires from the CUG server and temporally hold the Talk group information containing the identification information of the first PTT communication terminal device to establish call control of the radio communication processing among the PTT communication terminal devices in the Talk group information containing the identification information of the first PTT communication terminal device and to transmit to the first PTT communication terminal device and the second PTT communication terminal device the notification that the call control of the radio communication processing among PTT communication terminal devices in the Talk group information has been established. In addition, the audio information received from the first PTT communication terminal device is transmitted to the second PTT communication terminal device (Step B5). This causes the audio information received at the second PTT communication terminal device from the PTT server to be outputted from the speaker of the second PTT communication terminal device so that the user of the second PTT communication terminal device can hear the speech from the user of the first PTT communication terminal device. Note that, in order that the PTT server establishes the call control of the radio communication processing among the PTT communication terminal devices in the Talk group information containing the identification information of the first PTT communication terminal device, the CUG server may transmit to the PTT server the Talk group information containing the identification information of the first PTT communication terminal device if the CUG server has determined that the identification information of the first PTT communication terminal device has been registered in the Talk group information.

In addition, if the authentication result received from the CUG server is a determination result that the identification information of the first PTT communication terminal device is not registered, the call request to the second PTT communication terminal device is not to be responded. Specifically, call control of the radio communication processing among the PTT communication terminal devices in the Talk group information containing the identification information of the first PTT communication terminal device is not established; the audio information received from the first PTT communication terminal device is not transmitted to the second PTT communication terminal device; and the authentication result that the call request to the second PTT communication terminal device is not to be responded is notified to the first PTT communication terminal device (Step B5).

As described above, when a call request toward the second PTT communication terminal device is made to the PTT serve from the first PTT communication terminal device, and the audio information acquired through a microphone of the first PTT communication terminal device is transmitted to the PTT server, one step of operation in the first PTT communication terminal device causes the audio information to be notified to the second PTT communication terminal device, thereby allowing the transmission of the audio information without performing complicated operation on the first PTT communication terminal device.

Embodiment 3

Next, the third Embodiment will be described.

Figure 7:
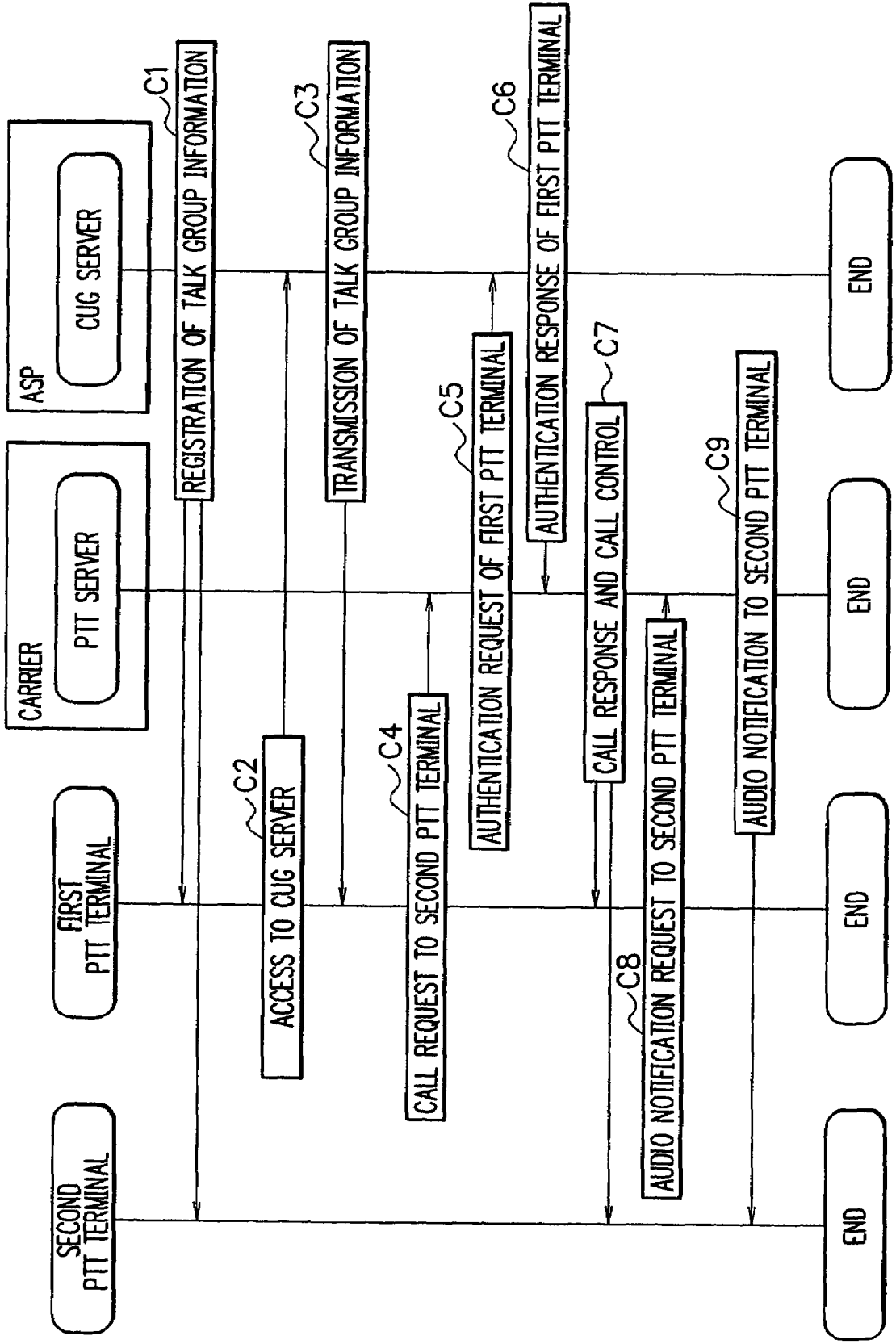
FIG. 7 is a sequence chart showing operation in a radio communications system of the Embodiment 3 according to the present invention.

In the first Embodiment, the Talk group information is stored in the storage section of the first PTT communication terminal device, but the third Embodiment is characterized in that Talk group information is not stored in the storage section of the first PTT communication terminal device, and the first PTT communication terminal device accesses the CUG server to acquire the Talk group information registered in the CUG server so that the radio communication processing as in the first Embodiment is implemented based on that acquired Talk group information. The radio communication processing in the third embodiment will be described with reference to FIG. 7.

At first, the Talk group information is registered to a storage section of a CUG server and the first PTT communication terminal device stores connection information for accessing a CUG server in a storage section of the first PTT communication terminal device (Step C1).

Next, the first PTT communication terminal device accessing the CUG server based on the connection information stored in the storage section of the first PTT communication terminal device (Step C2), and the first PTT communication terminal device acquires the Talk group information registered in the CUG server (Step C3). If available period information included in the Talk group information registered in the CUG server exceeds the available period enabling radio communication, the first PTT communication terminal device cannot acquire the Talk group information from the CUG server and cannot perform the radio communication processing.

The first PTT communication terminal device in acquisition of the Talk group information from the CUG server makes, based on that acquired Talk group information, a call request to the second PTT communication terminal device included in the Talk group information, an operation button (press-talk switch) of the first PTT communication terminal device is pushed down so that a call request toward the second PTT communication terminal device is made to the PTT server and the Talk group information acquired from the CUG server is transmitted to the PTT server (Step C4). In addition, like the operation in the first embodiment, the audio information is notified to the second PTT communication terminal device through the PTT server from the first PTT communication terminal device (Step C5 to Step C9).

Thus, the first PTT communication terminal device accesses the CUG server to acquire the Talk group information registered in the CUG server, so as to perform radio communication processing with the PTT communication terminal device in the acquired Talk group information so that radio communication processing as in the first Embodiment can be implemented without registering the Talk group information in the storage section of the PTT communication terminal device.

Embodiment 4

Next, the fourth Embodiment will be described.

Figure 8:
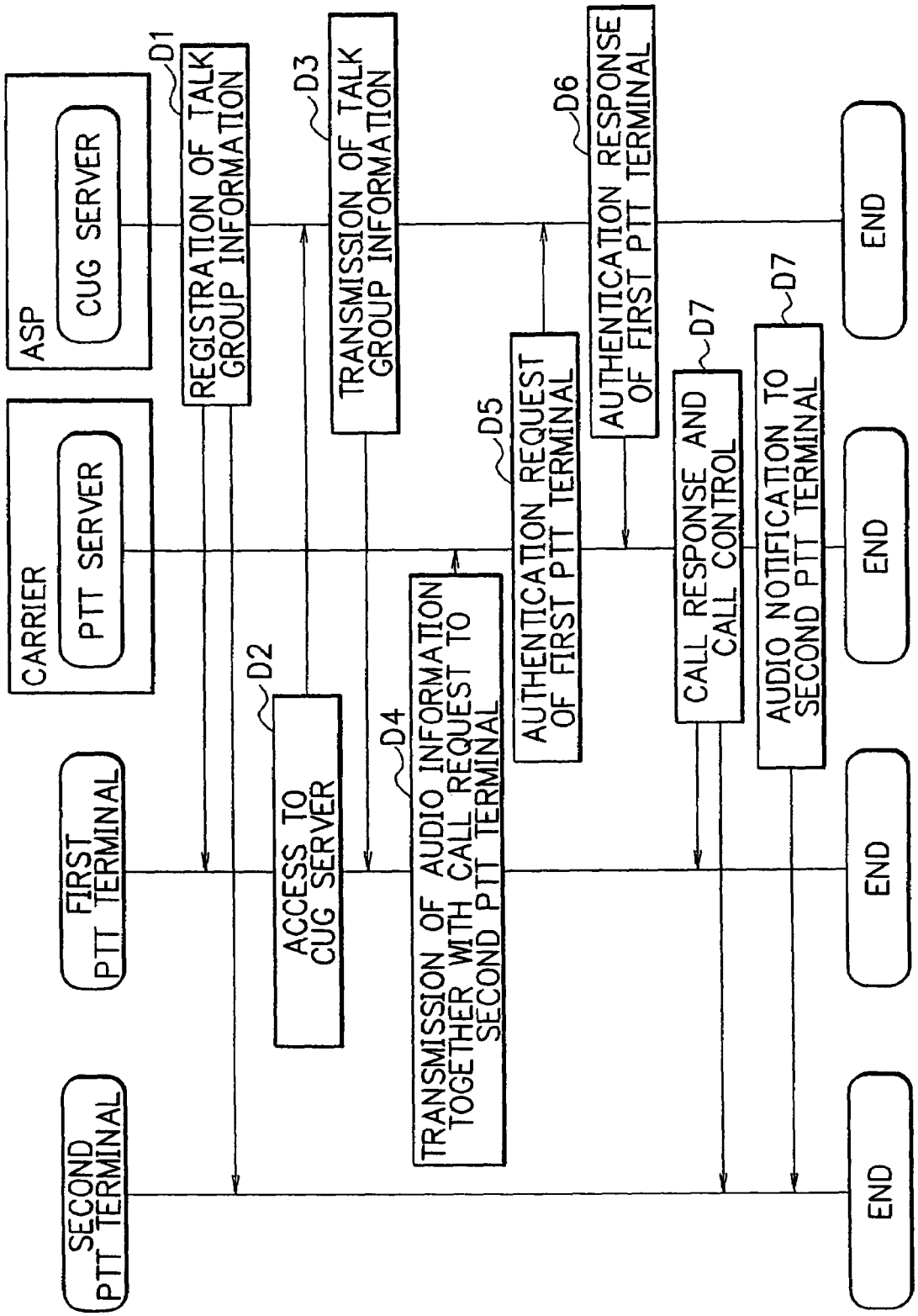
FIG. 8 is a sequence chart showing operation in a radio communications system of the Embodiment 4 according to the present invention.

In the second Embodiment, the Talk group information is stored in the storage section of the first PTT communication terminal device, but the fourth Embodiment is characterized in that the Talk group information is not stored in the storage section of the first PTT communication terminal device, and the first PTT communication terminal device accesses the CUG server to acquire the Talk group information registered in the CUG server so that the radio communication processing as in the first Embodiment is implemented based on that acquired Talk group information. The radio communication processing in the fourth Embodiment will be described with reference to FIG. 8.

At first, the Talk group information is registered in a storage section of a CUG server, and the first PTT communication terminal device stores connection information for accessing a CUG server in a storage section of the first PTT communication terminal device (Step D1).

Next, the first PTT communication terminal device accesses the CUG server based on the connection information stored in the storage section of the first PTT communication terminal device (Step D2), and the first PTT communication terminal device acquires the Talk group information registered in the CUG server (Step D3). Next, the first PTT communication terminal device makes, based on the Talk group information from the CUG server, a call request to the second PTT communication terminal device included in the Talk group information; an operation button (press-talk switch) of the first PTT communication terminal device is pushed down so that a call request toward the second PTT communication terminal device is made to the PTT server and the Talk group information acquired from the CUG server is transmitted to the PTT server. In addition, the audio information acquired through a microphone of the first PTT communication terminal device is transmitted to the PTT server simultaneously (Step D4). In addition, like the operation in the second Embodiment, the audio information is notified to the second PTT communication terminal device through the PTT server from the first PTT communication terminal device (Step D5 to Step D7).

Thus, the first PTT communication terminal device accesses the CUG server to acquire the Talk group information registered in the CUG server, so as to perform radio communication processing with the PTT communication terminal device in the acquired Talk group information so that radio communication processing as in the second Embodiment can be implemented without registering the Talk group information in the storage section of the PTT communication terminal device.

Embodiment 5

Next, the fifth Embodiment will be described.

Figure 9:
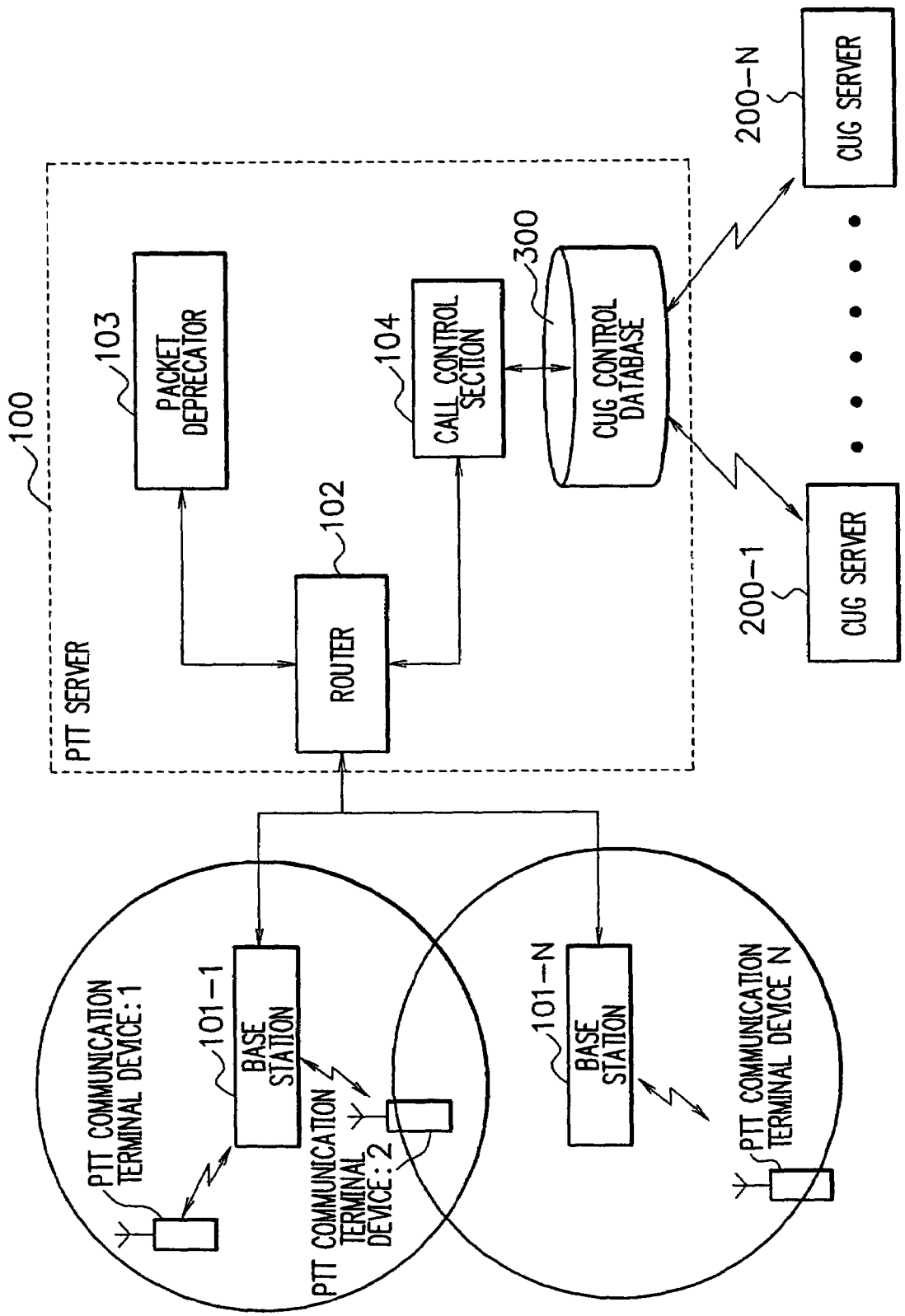
FIG. 9 shows a system configuration of a radio communications system in Embodiment 5 according to the present invention.
Figure 10:
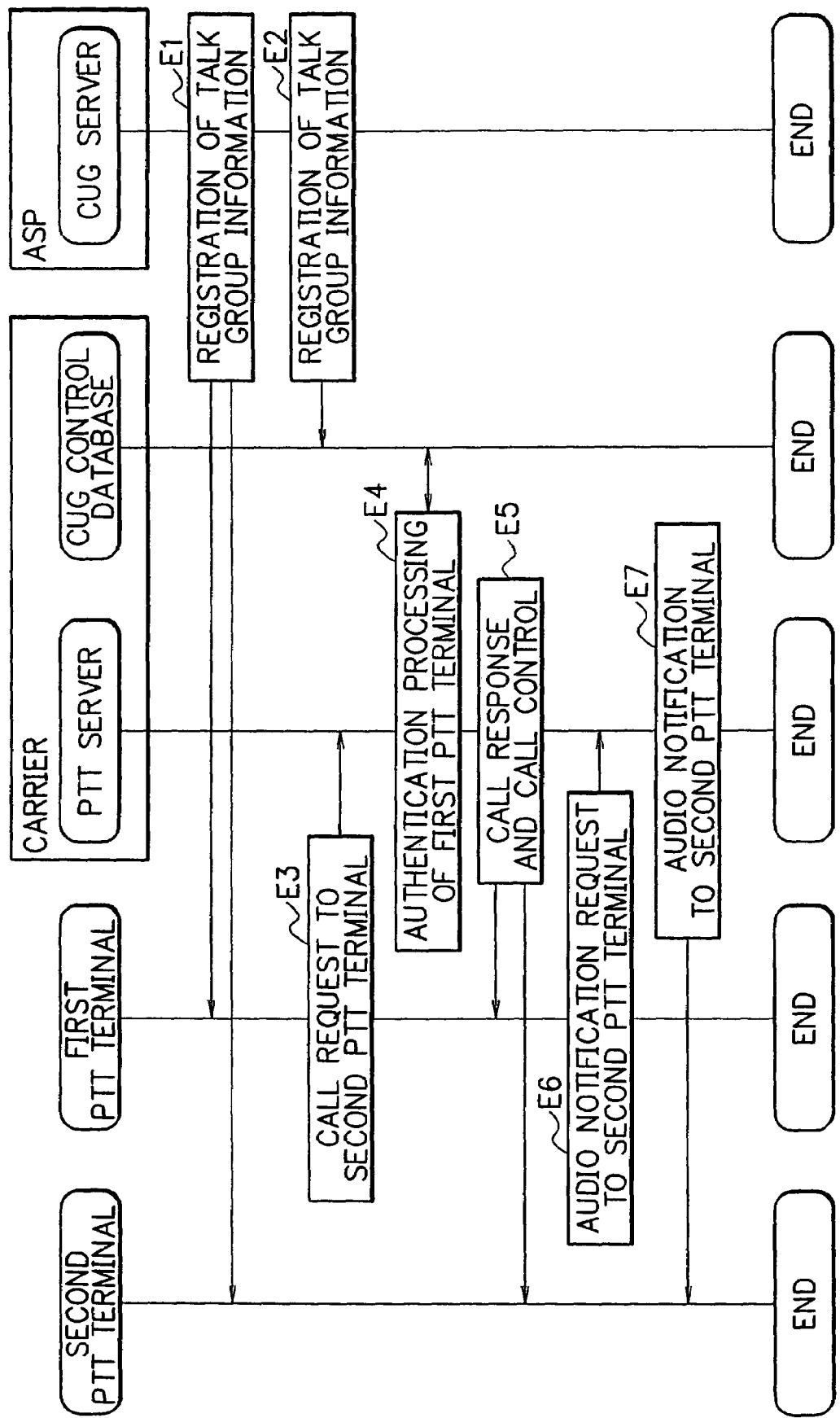
FIG. 10 is a sequence chart showing operation in a radio communications system of the Embodiment 5 according to the present invention.

The fifth Embodiment is characterized in that the carrier owns the CUG control database for controlling the CUG server owned by an ASP so that the authentication processing of the PTT communication terminal devices that is otherwise implemented in the servers is implemented with the CUG control database. With reference to FIG. 9, radio communications system configuration in the fifth Embodiment will be described, and thereafter, with reference to FIG. 10, operation of the radio communications system in the fifth embodiment will be described as follows.

The radio communications system in the fifth embodiment is also, as shown in FIG. 9, provided with a CUG control database (300) for dividing and controlling the Talk group information registered in a plurality of CUG servers (200-1 to 200-N) on CUG-server-by-CUG-server basis so that authentication processing on the PTT communication terminal devices (1 to N) is implemented based on the Talk group information held in the CUG control database (300). Note that the carrier owns the CUG control database (300), which controls a plurality of CUG servers (200-1 to 200-N) to be provided to companies such as ASP, and controls registration fees of radio communication paid by the companies such as ASP. The radio communications processing in the fifth Embodiment will be described with reference to FIG. 10 as follows.

At first, Talk group information is registered in the storage section of the CUG servers, and the Talk group information is stored in the storage section of the first PTT communication terminal device (Step E1).

Next, the CUG server transmits the Talk group information registered in the storage section of the CUG server to the CUG control database of the carrier, and registers the Talk group information into the CUG control database (Step E2).

Next, the first PTT communication terminal device makes, using the Talk group information stored in the storage section of the first PTT communication terminal device, a call request to the second PTT communication terminal device, and at the time when an operation button (press-talk switch) of the first PTT communication terminal device is pushed down, a call request to the second PTT communication terminal device is made to the PTT server and the Talk group information stored in the storage section of the first PTT communication terminal device is transmitted to the PTT server (Step E3).

In order to determine whether or not to respond to the call request to the second PTT communication terminal device, the PTT server that has received the call request from the first PTT communication terminal device determines, based on the identification information of the CUG server included in The Talk group information received together with the call request from the first PTT communication terminal device, whether or not the identification information of the first PTT communication terminal device included in the Talk group information received together with the call request from the first PTT communication terminal device is registered in the CUG control database (Step E4).

If this determination processing results in the determination that the identification information of the first PTT communication terminal device is registered in the CUG control database, the PTT server responds to the call request to the second PTT communication terminal device. Specifically, the PTT server acquires from the CUG control database and temporally hold the Talk group information containing the identification information of the first PTT communication terminal device to establish call control of the radio communication processing among the PTT communication terminal devices in the Talk group information containing the identification information of the first PTT communication terminal device, and to transmit to the first PTT communication terminal device the authentication result that the call request to the second PTT communication terminal device is to be responded. In addition, the PTT server transmits to the second PTT communication terminal device the notification that the call control of the radio communication processing among PTT communication terminal devices in the Talk group information has been established.

In addition, if it is determined that the identification information of the first PTT communication terminal device is not registered in the CUG control database, the call request to the second PTT communication terminal device is not responded. Specifically, call control of the radio communication processing among the PTT communication terminal devices in the Talk group information containing the identification information of the first PTT communication terminal device is established, and the authentication result that the call request to the second PTT communication terminal device is not to be responded is transmitted to the first PTT communication terminal device (Step E5).

Next, if the authentication result received from the PTT server is the authentication result that the call request to the second PTT communication to terminal device is to be responded to, the PTT communication terminal device transmits the audio information to the second PTT communication terminal device, and an audio notification request for notifying to the second PTT communication terminal device, audio information acquired from the microphone of the first PTT communication terminal device is transmitted together with the audio information to the PTT server (Step E6).

The PTT server of which call control is established transmits the audio information to the second PTT communication terminal device based on the audio notification request from the first PTT communication terminal device (Step E7). This cause the audio information received at the second PTT communication terminal device from the PTT server to be outputted from the speaker of the second PTT communication terminal device, and enable the user of the second PTT communication terminal device to hear the speech from the user of the first PTT communication terminal device.

As described, the Talk group information registered in the CUG server is registered into the CUG control database; authentication processing of the first PTT communication terminal device is performed based on the Talk group information registered in that CUG control database; and, the call control of the radio communications processing among the PTT communication terminal devices in the Talk group information containing the identification information of the PTT communication terminal device is established in the PTT server, thereby eliminating the requirement for transmission of the authentication request of the PTT communication terminal device to outside servers, and hence simplifying radio communications processing. In addition, the CUG servers provided to companies can be collectively controlled.

Note that Talk group information to be registered in the CUG control database includes available period information to enable radio communications so that, if it is determined that the available period to enable radio communications has been expired at the time when the PTT server performs authentication processing of the first PTT communication terminal device based on the Talk group information registered in the CUG control database, the information indicating that radio communication cannot undergo communication processing is transmitted to the first PTT communication terminal device, so as to the PTT communication terminal device to enable radio communication to be controlled. In addition, the PTT communication terminal device to enable radio communication can also be controlled by the PTT server deleting from the CUG control database, the Talk group information of which the available period to enable radio communication has been expired.

Embodiment 6

Next, the sixth Embodiment will be described.

Figure 11:
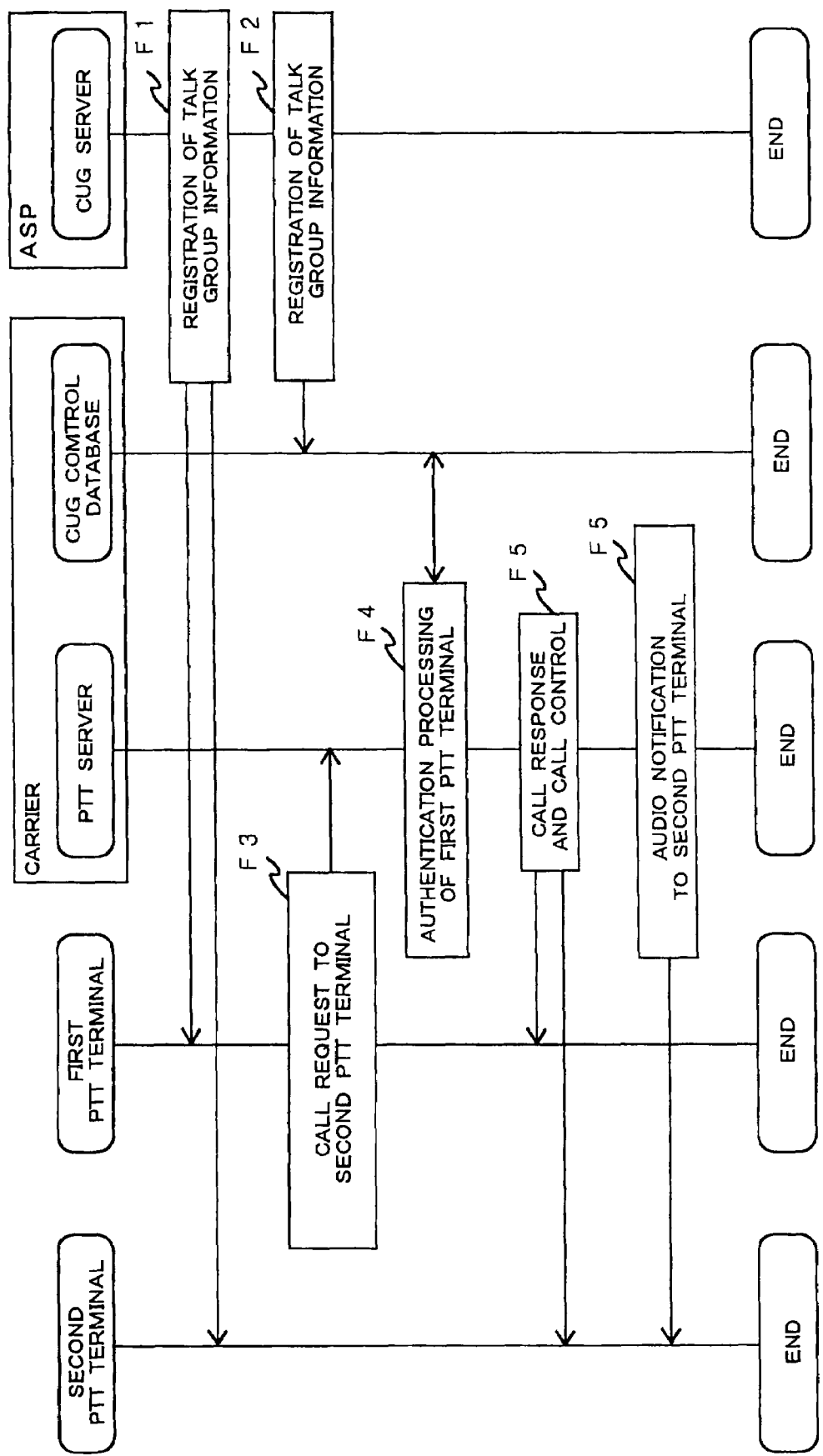
FIG. 11 is a sequence chart showing operation in a radio communications system of the Embodiment 6 according to the present invention.

The sixth Embodiment is characterized in that the radio communications system is also provided with a CUG control database for controlling CUG servers as in the fifth Embodiment; the authentication processing of the PTT communication terminal devices is performed based on the Talk group information registered in the CUG control database and thus performing the radio communications processing as in the second Embodiment. With reference to FIG. 11, operation of the sixth Embodiment will be described as follows.

At first, Talk group information is registered in the storage section of the CUG servers, and in addition, the Talk group information is stored in the storage section of the first PTT communication terminal device (Step F1).

Next, the CUG server transmits the Talk group information registered in the storage section of the CUG server to the CUG control database of the carrier side, and registers the Talk group information into the CUG control database (Step F2).

At the time when the operation button (press-talk switch) of the first PTT communication terminal device is pushed down, the first PTT communication terminal device for making a call request to the second PTT communication terminal device, makes a call request to the second PTT communication terminal device, to the PTT server and transmits the Talk group information stored in the storage section of the first PTT communication terminal device to the PTT server. In addition, the audio information acquired through a microphone of the first PTT communication terminal device is transmitted to the PTT server (Step F3).

The PTT server that has received the call request from the first PTT communication terminal device determines whether or not the identification information of the first PTT communication terminal device included in the Talk group information received from the first PTT communication terminal device together with the call request is registered in the CUG control database, in order to determine whether or not to respond to the call request to the second PTT communication terminal device (Step F4).

If this determination processing results in the determination that the identification information of the first PTT communication terminal device is registered in the CUG control database, the PTT server is to respond to the call request to the second PTT communication terminal device, and the PTT server acquires from the CUG control database and temporally hold the Talk group information containing the identification information of the first PTT communication terminal device to establish call control of the radio communication processing among the PTT communication terminal devices in the Talk group information containing the identification information of the first PTT communication terminal device, and to transmit to the first PTT communication terminal device and the second PTT communication terminal device the notification that the call request in the second PTT communication terminal device among PTT communication terminal devices in the Talk group information has been established. In addition, the audio information received from the first PTT communication terminal device is transmitted to the second PTT communication terminal device (Step F5). This causes the audio information received at the second PTT communication terminal device from the PTT server to be outputted from the speaker of the second PTT communication terminal device, and enable the user of the second PTT communication terminal device to hear the speech from the holder of the first PTT communication terminal.

In addition, if the identification information of the first PTT communication terminal device is not registered in the CUG control database, the PTT server is not to respond to the call request to the second PTT communication terminal device. Specifically, call control of the radio communication processing among the PTT communication terminal devices in the Talk group information containing the identification information of the first PTT communication terminal device is not established; the audio information received from the first PTT communication terminal device is not transmitted to the second PTT communication terminal device; and the authentication result that the call request to the second PTT communication terminal device is not to be responded is transmitted to the first PTT communication terminal device (Step F5).

As described above, the Talk group information registered in the CUG server is registered into the CUG control database. In addition, a call request toward the second PTT communication terminal device is made from the first PTT communication terminal device to the PTT server; the audio information acquired through a microphone of the first PTT communication terminal device is transmitted to the PTT server; authentication processing of the PTT communication terminal device is performed based on the Talk group information registered in the CUG control database; and the call control of the radio communication among the PTT communication terminal devices in the Talk group information containing identification information of the first PTT communication terminal device is established in the PTT server, thereby simplifying authentication processing of the PTT communication terminal device, enabling transmission of the audio information to the second PTT communication terminal device in the first PTT communication terminal device without any complicated operation.

Embodiment 7

Next, the seventh Embodiment will be described.

The seventh Embodiment is characterized in that the radio communications system is also provided with a CUG control database for controlling CUG servers as in the fifth Embodiment; the Talk group information is not stored in the storage section of the first PTT communication terminal device, and the first PTT communication terminal device accesses the CUG server to acquire the Talk group information registered in the CUG server so that the radio communication processing as in the fifth Embodiment is implemented based on that acquired Talk group information. The radio communication processing in the seventh embodiment will be described with reference to FIG. 12.

At first, the Talk group information is registered to a storage section of a CUG server, and the first PTT communication terminal device stores connection information for making an access to a CUG server in a storage section of the first PTT communication terminal device (Step G1).

Next, the CUG server transmits the Talk group information registered in the storage section of the CUG server to the CUG control database of the carrier side, and registers the Talk group information into the CUG control database (Step G2).

Next, the first PTT communication terminal device accesses the CUG server based on the connection information stored in the storage section of the first PTT communication terminal device (Step G3), and the first PTT communication terminal device acquires the Talk group information registered in the CUG server (Step G4). Next, the first PTT communication terminal device makes, based on the Talk group information from the CUG server, a call request to the second PTT communication terminal device included in the Talk group information; an operation button (press-talk switch) of the first PTT communication terminal device is pushed down so that a call request to the second PTT communication terminal device is made to the PTT server, and the Talk group information acquired from the CUG server is transmitted to the PTT server (Step G5). In addition, like the operation in the fifth Embodiment, the audio information is notified to the second PTT communication terminal device through the PTT server from the first PTT communication terminal device (Step G5 to Step G9).

Thus, the first PTT communication terminal device accesses the CUG server to acquire the Talk group information registered in the CUG server, so as to perform with the PTT communication terminal device, radio communication processing of the identification information of the PTT communication terminal device registered in that acquired Talk group information, thereby enabling implementation of radio communication processing as in the fifth embodiment without registering the Talk group information in the storage section of the PTT communication terminal device.

Embodiment 8

Next, the eighth Embodiment will be described.

The eighth Embodiment is characterized that the radio communications system is also provided with a CUG control database for controlling CUG servers as in the fifth Embodiment; the Talk group information is not stored in the storage section of the first PTT communication terminal device, and the first PTT communication terminal device accesses the CUG server to acquire the Talk group information registered in the CUG server so that the radio communication processing as in the sixth Embodiment is implemented based on that acquired Talk group information. The radio communication processing in the eighth embodiment will be described with reference to FIG. 13.

At first, the Talk group information is registered in a storage section of a CUG server and the first PTT communication terminal device stores connection information for accessing a CUG server in a storage section of the first PTT communication terminal device (Step H1).

Next, the CUG server transmits the Talk group information registered in the storage section of the CUG server to the CUG control database of the carrier side, and registers the Talk group information into the CUG control database (Step H2).

Next, the first PTT communication terminal device accessing the CUG server based on the connection information stored in the storage section of the first PTT communication terminal device (Step H3), and the first PTT communication terminal device acquires the Talk group information registered in the CUG server (Step H4).

The first PTT communication terminal device makes, based on the Talk group information from the CUG server, a call request to the second PTT communication terminal device included in the Talk group information; an operation button (press-talk switch) of the first PTT communication terminal device is pushed down so that a call request toward the second PTT communication terminal device is made to the PTT server, and the Talk group information acquired from the CUG server is transmitted to the PTT server. In addition, the audio information acquired through a microphone of the first PTT communication terminal device is simultaneously transmitted to the PTT server (Step H5). In addition, like the operation in the sixth Embodiment, the audio information is notified to the second PTT communication terminal device through the PTT server from the first PTT communication terminal device (Step H6 to Step H7).

Thus, the first PTT communication terminal device accesses the CUG server to acquire the Talk group information registered in the CUG server, so as to perform radio communication processing with the PTT communication terminal device in the acquired Talk group information, thereby enabling implementation of radio communication processing as in the sixth embodiment without registering the Talk group information in the storage section of the PTT communication terminal device.

Note that the above described embodiments are preferred embodiments of the present invention, and the present invention can be embodied with various modifications without departing from the gist thereof. For example, in the above described embodiments, as for the radio communications system comprising the PTT server and the CUG servers that are respectively independent, there is no particular limitation on the transmission and reception of information implemented through the PTT communication terminal devices, the PTT server, and the CUG servers, provided that the radio communications processing among the PTT communication terminal devices in the Talk group information registered in the CUG server can be established with the PTT server so as to enable voice information transmitted from the PTT communication terminal device to the PTT server to be transmitted to the PTT communication terminal devices established with the PTT server. In addition, the Talk group information for transmission and reception among the radio communications systems in the above described embodiments may be transmitted and received as addresses expressed in form of URI and the like corresponding to telephone numbers, and the forms of that Talk group information is not specified. In addition, the radio communications system according to the present invention can be constructed by making a program for the operation in the above described embodiment to be executed in an information processing device with which radio communications processing among the PTT communication terminal devices can be established.

The radio communications system and the radio communications method according to the present invention are applicable to the radio communications system where the information communication terminal device is equipped with a transceiver function, with a predetermined operation button being pushed down so as to enable radio communications processing among particular communication terminal devices.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A radio communications system comprising a plurality of communication terminal devices for performing radio communications with a press-talk switch, a server for establishing radio communication processing among said communication terminal devices, and a plurality of Closed User Group servers for controlling said communication terminal devices for establishing said radio communication processing, said server and said Closed User Group server respectively being owned by different companies, wherein said Closed User Group server has:
group information storage means for making a group among particular communication terminal devices to implement radio communication with said press-talk switches, and storing group information where Closed User Group identification information for identifying Closed User Group servers is given to the made group, said communication terminal device has:
radio communications group acquisition means for acquiring, from said Closed User Group servers, the group information among particular communication terminal devices for implementing radio communication with said press-talk switches; and audio information notification requesting means for transmitting to said server, together with said group information, an audio information notification request for notifying audio information to a second communication terminal device in the group information acquired by said radio communications group acquisition means, and said server has:

radio communications establishment means for acquiring, on receipt of the audio information notification request from said communication terminal device, based on the Closed User Group identification information in the group information received together with said audio notification request, the group information of said communication terminal device from said Closed User Group server, establishing radio communication among the communication terminal devices in the acquired group information, and transmitting audio information to the second communication terminal device in said group information.

2. The radio communications system according to claim 1, wherein:

said communication terminal device further has group information storage means for storing said group information acquired from said Closed User Group server by said radio communication group acquisition means; and said audio information notification requesting means transmits to said server, together with said group information, an audio information notification request for notifying audio information to the second communication terminal device in said group information stored by said group information storage means.

3. The radio communications system according to claim 2, wherein:

said radio communications group acquisition means makes connection with said Closed User Group server, and acquires said group information from said Closed User Group server; and said audio information notification requesting means transmits to said server, together with said group information, an audio information notification request for notifying audio information to a second PTT communication terminal device in said group information acquired by connection to said Closed User Group server.

4. The radio communications system according to claim 3, wherein:

said communication terminal device further has audio information simultaneous notification requesting means for transmitting to said server, audio information to the second communication terminal device, together with an audio information notification request for notifying audio information to the second communication terminal device in said group information acquired from said Closed User Group server; and said server further has audio information simultaneous transmission means for transmitting to said second communication terminal device, the audio information received together with said audio information notification request from said communication terminal device.

5. The radio communications system according to claim 4, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

6. The radio communications system according to claim 4, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

7. The radio communications system according to claim 2, wherein:

said communication terminal device further has audio information simultaneous notification requesting means for transmitting to said server, audio information to the second communication terminal device, together with an audio information notification request for notifying audio information to the second communication terminal device in said group information acquired from said Closed User Group server; and said server further has audio information simultaneous transmission means for transmitting to said second communication terminal device, the audio information received together with said audio information notification request from said communication terminal device.

8. The radio communications system according to claim 7, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

9. The radio communications system according to claim 7, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

10. The radio communications system according to claim 2, wherein:

the second communication terminal device in said group information comprises at least one of communication terminal devices in said group information; and said communication terminal device further has second communication terminal device setting means for selecting at least one of communication terminal devices in said group information and setting the second communication terminal device in said group information.

11. The radio communications system according to claim 1, wherein:
   said radio communications group acquisition means makes connection with said Closed User Group server, and acquires said group information from said Closed User Group server; and
   said audio information notification requesting means transmits to said server, together with said group information, an audio information notification request for notifying audio information to a second PTT communication terminal device in said group information acquired by connection to said Closed User Group server.

12. The radio communications system according to claim 11, wherein:
   said communication terminal device further has audio information simultaneous notification requesting means for transmitting to said server, audio information to the second communication terminal device, together with an audio information notification request for notifying audio information to the second communication terminal device in said group information acquired from said Closed User Group server; and
   said server further has audio information simultaneous transmission means for transmitting to said second communication terminal device, the audio information received together with said audio information notification request from said communication terminal device.

13. The radio communications system according to claim 12, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

14. The radio communications system according to claim 12, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

15. The radio communications system according to claim 11, wherein:
   the second communication terminal device in said group information comprises at least one of communication terminal devices in said group information; and
   said communication terminal device further has second communication terminal device setting means for selecting at least one of communication terminal devices in said group information and setting the second communication terminal device in said group information.

16. The radio communications system according to claim 1, wherein:
   the second communication terminal device in said group information comprises at least one of communication terminal devices in said group information; and
   said communication terminal device further has second communication terminal device setting means for selecting at least one of communication terminal devices in said group information and setting the second communication terminal device in said group information.

17. A radio communications system comprising a plurality of communication terminal devices for performing radio communications with a press-talk switch, a server for establishing radio communication processing among said communication terminal devices, a plurality of Closed User Group servers for controlling said communication terminal devices for establishing said radio communication processing, and a Closed User Group control database for controlling said Closed User Group servers, said server and said Closed User Group server respectively being owned by different companies, wherein
   said Closed User Group server has:
   group information storage means for making a group among particular communication terminal devices to implement radio communication with said press-talk switches, and storing group information where Closed User Group identification information for identifying Closed User Group servers is given to the made group; and
   group information registration means for registering said group information stored by said group information storage means in said Closed User Group control database,
   said communication terminal device has:
   radio communications group acquisition means for acquiring, from said Closed User Group servers, the group information among particular communication terminal devices for implementing wireless communication with said press-talk switches; and
   audio information notification requesting means for transmitting to said server, together with said group information, an audio information notification request for notifying audio information to a second communication terminal device in the group information acquired by said radio communications group acquisition means, and
   said server has:
   radio communications establishment means for acquiring, on receipt of the audio information notification request from said communication terminal device, based on the Closed User Group identification information in the group information received together with said audio notification request, the group information of said communication terminal device from said Closed User Group control database, establishing radio communication among the communication terminal devices in the acquired group information, and transmitting audio information to the second communication terminal device in said group information.

18. The radio communications system according to claim 17, wherein:
   said communication terminal device further has group information storage means for storing said group information acquired from said Closed User Group server by said radio communication group acquisition means; and
   said audio information notification requesting means transmits to said server, together with said group information, an audio information notification request for notifying audio information to the second communication terminal device in said group information stored by said group information storage means.

19. The radio communications system according to claim 18, wherein:

said radio communications group acquisition means makes connection with said Closed User Group server, and acquires said group information from said Closed User Group server; and said audio information notification requesting means transmits to said server, together with said group information, an audio information notification request for notifying audio information to a second PTT communication terminal device in said group information acquired by connection to said Closed User Group server.

20. The radio communications system according to claim 19, wherein:

said communication terminal device further has audio information simultaneous notification requesting means for transmitting to said server, audio information to the second communication terminal device, together with an audio information notification request for notifying audio information to the second communication terminal device in said group information acquired from said Closed User Group server; and said server further has audio information simultaneous transmission means for transmitting to said second communication terminal device, the audio information received together with said audio information notification request from said communication terminal device.

21. The radio communications system according to claim 20, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

22. The radio communications system according to claim 20, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

23. The radio communications system according to claim 18, wherein:

said communication terminal device further has audio information simultaneous notification requesting means for transmitting to said server, audio information to the second communication terminal device, together with an audio information notification request for notifying audio information to the second communication terminal device in said group information acquired from said Closed User Group server; and said server further has audio information simultaneous transmission means for transmitting to said second communication terminal device, the audio information received together with said audio information notification request from said communication terminal device.

24. The radio communications system according to claim 23, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

25. The radio communications system according to claim 23, wherein, if it is determined that the information of said communication terminal device is registered in said control database, said audio information simultaneous transmission means establishes radio communication among the communication terminal devices in the group information of said communication terminal devices, and transmits to said second communication terminal device the audio information received together with said audio information notification request from said communication terminal device.

26. The radio communications system according to claim 18, wherein:

the second communication terminal device in said group information comprises at least one of communication terminal devices in said group information; and said communication terminal device further has second communication terminal device setting means for selecting at least one of communication terminal devices in said group information and setting the second communication terminal device in said group information.

27. The radio communications system according to claim 17, wherein:

said radio communications group acquisition means makes connection with said Closed User Group server, and acquires said group information from said Closed User Group server; and said audio information notification requesting means transmits to said server, together with said group information, an audio information notification request for notifying audio information to a second PTT communication terminal device in said group information acquired by connection to said Closed User Group server.

28. The radio communications system according to claim 27, wherein:

said communication terminal device further has audio information simultaneous notification requesting means for transmitting to said server, audio information to the second communication terminal device, together with an audio information notification request for notifying audio information to the second communication terminal device in said group information acquired from said Closed User Group server; and said server further has audio information simultaneous transmission means for transmitting to said second communication terminal device, the audio information received together with said audio information notification request from said communication terminal device.

29. The radio communications system according to claim 28, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

30. The radio communications system according to claim 28, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

31. The radio communications system according to claim 27, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

32. The radio communications system according to claim 17, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

33. A radio communications system comprising a plurality of communication terminal devices for performing radio communications with a press-talk switch, a server for establishing radio communication among said communication terminal devices, and a plurality of Closed User Group servers for controlling said communication terminal devices for establishing said radio communications, said server and said Closed User Group server respectively being owned by different companies, wherein
said Closed User Group server has:
group information storage means for making a group among particular communication terminal devices to implement radio communication with said press-talk switches, and storing group information where Closed User Group identification information for identifying Closed User Group servers is given to the made group; and
authentication response transmission means for, on receipt of an authentication request of a communication terminal device from said server, determining whether or not information of said communication terminal device is stored in the group information stored by said group information storage means, and transmitting the authentication result to said server,
said communication terminal device has:
radio communications group acquisition means for acquiring, from said Closed User Group servers, the group information among particular communication terminal devices for implementing radio communication with said press-talk switches;
audio information notification requesting means for transmitting to said server, together with said group information, an audio information notification request for notifying audio information to a second communication terminal device in the group information acquired by said radio communications group acquisition means; and
audio information transmission means for, on receipt of a response result that said audio information notification request is to be responded, from said server to which said audio information notification request has been transmitted with said audio information notification requesting means, transmitting to said server, audio information to said second communication terminal device; and
said server has:
authentication request transmission means for, on receipt of the audio information notification request from said communication terminal device, selecting said Closed User Group server based on the Closed User Group identification information in the group information received together with said audio information notification request, and transmitting an authentication request of said communication terminal device to said Closed User Group server;
audio information notification response means for, on receipt of an authentication result from said Closed User Group server to which an authentication request has been transmitted by said authentication request transmission means, establishing radio communication among the communication terminal devices in the group information of said communication terminal devices in accordance with the authentication result, and transmitting to said communication terminal device a response result whether or not to respond to the audio information notification request received from said communication terminal device; and
audio information relaying means for, on receipt of the audio information to said second communication terminal device from said communication terminal device, transmitting said received audio information to said second communication terminal device.

34. The radio communications system according to claim 33, wherein:
said communication terminal device further has group information storage means for storing said group information acquired from said Closed User Group server by said radio communication group acquisition means; and
said audio information notification requesting means transmits to said server, together with said group information, an audio information notification request for notifying audio information to the second communication terminal device in said group information stored by said group information storage means.

35. The radio communications system according to claim 34, wherein:
said radio communications group acquisition means makes connection with said Closed User Group server, and acquires said group information from said Closed User Group server; and
said audio information notification requesting means transmits to said server, together with said group information, an audio information notification request for notifying audio information to a second PTT communication terminal device in said group information acquired by connection to said Closed User Group server.

36. The radio communications system according to claim 35, wherein:
- said communication terminal device further has audio information simultaneous notification requesting means for transmitting to said server, audio information to the second communication terminal device, together with an audio information notification request for notifying audio information to the second communication terminal device in said group information acquired from said Closed User Group server; and
- said server further has audio information simultaneous transmission means for transmitting to said second communication terminal device, the audio information received together with said audio information notification request from said communication terminal device.

37. The radio communications system according to claim 36, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

38. The radio communications system according to claim 36, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

39. The radio communications system according to claim 34, wherein:
- said communication terminal device further has audio information simultaneous notification requesting means for transmitting to said server, audio information to the second communication terminal device, together with an audio information notification request for notifying audio information to the second communication terminal device in said group information acquired from said Closed User Group server; and
- said server further has audio information simultaneous transmission means for transmitting to said second communication terminal device, the audio information received together with said audio information notification request from said communication terminal device.

40. The radio communications system according to claim 39, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

41. The radio communications system according to claim 39, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

42. The radio communications system according to claim 34, wherein:
- the second communication terminal device in said group information comprises at least one of communication terminal devices in said group information; and
- said communication terminal device further has second communication terminal device setting means for selecting at least one of communication terminal devices in said group information and setting the second communication terminal device in said group information.

43. The radio communications system according to claim 33, wherein:
- said radio communications group acquisition means makes connection with said Closed User Group server, and acquires said group information from said Closed User Group server; and
- said audio information notification requesting means transmits to said server, together with said group information, an audio information notification request for notifying audio information to a second PTT communication terminal device in said group information acquired by connection to said Closed User Group server.

44. The radio communications system according to claim 43, wherein:
- said communication terminal device further has audio information simultaneous notification requesting means for transmitting to said server, audio information to the second communication terminal device, together with an audio information notification request for notifying audio information to the second communication terminal device in said group information acquired from said Closed User Group server; and
- said server further has audio information simultaneous transmission means for transmitting to said second communication terminal device, the audio information received together with said audio information notification request from said communication terminal device.

45. The radio communications system according to claim 44, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

46. The radio communications system according to claim 44, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

47. The radio communications system according to claim 43, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

48. The radio communications system according to claim 33, wherein:
if the authentication result received from said Closed User Group server to which the authentication request has been transmitted by said authentication request transmission means is an authentication result that information of said communication terminal device is stored in the group information stored by said group information storage means, said audio information notification response means establishes radio communication among the communication terminal devices in the group information of said communication terminal devices and transmits to said communication terminal device a response result that said audio information notification request is to be responded; and
if the authentication result is an authentication result that information of said communication terminal device is not stored in the group information stored by said group information storage means, said audio information notification response means does not establish radio communication among the communication terminal devices in the group information of said communication terminal devices, and transmits to said communication terminal device, a response result that said audio information notification request is not be to be responded.

49. The radio communications system according to claim 48, wherein:
said communication terminal device further has audio information simultaneous notification requesting means for transmitting to said server, audio information to the second communication terminal device, together with an audio information notification request for notifying audio information to the second communication terminal device in said group information acquired from said Closed User Group server; and
said server further has audio information simultaneous transmission means for transmitting to said second communication terminal device, the audio information received together with said audio information notification request from said communication terminal device.

50. The radio communications system according to claim 49, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

51. The radio communications system according to claim 49, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

52. The radio communications system according to claim 48, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

53. The radio communications system according to claim 33, wherein:
said communication terminal device further has audio information simultaneous notification requesting means for transmitting to said server, audio information to the second communication terminal device, together with an audio information notification request for notifying audio information to the second communication terminal device in said group information acquired from said Closed User Group server; and
said server further has audio information simultaneous transmission means for transmitting to said second communication terminal device, the audio information received together with said audio information notification request from said communication terminal device.

54. The radio communications system according to claim 53, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

55. The radio communications system according to claim 53, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

56. The radio communications system according to claim 53, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

57. The radio communications system according to claim 33, wherein:

the second communication terminal device in said group information comprises at least one of communication terminal devices in said group information; and said communication terminal device further has second communication terminal device setting means for selecting at least one of communication terminal devices in said group information and setting the second communication terminal device in said group information.

58. A radio communications system comprising a plurality of communication terminal devices for performing radio communications with a press-talk switch, a server for establishing radio communication among said communication terminal devices, a plurality of Closed User Group servers for controlling said communication terminal devices for establishing said radio communications, and a Closed User Group control database for controlling said Closed User Group servers, said server and said Closed User Group server respectively being owned by different companies, wherein said Closed User Group server has:

group information storage means for making a group among particular communication terminal devices to implement radio communication with said press-talk switches, and storing group information where Closed User Group identification information for identifying Closed User Group servers is given to the made group; and group information registration means for registering said group information stored by said group information storage means in said Closed User Group control database, said communication terminal device has:

radio communications group acquisition means for acquiring, from said Closed User Group servers, the group information among particular communication terminal devices for implementing radio communication with said press-talk switches;

audio information notification request means for transmitting to said server together with said group information, an audio information notification request for notifying audio information to a second communication terminal device in the group information acquired by said radio communications group acquisition means; and audio information transmission means for, on receipt of a response result that said audio information notification request is to be responded, from said server that has transmitted said audio information notification request with said audio information notification requesting means, transmitting to said server, audio information to said second communication terminal device, and said server has:

audio information notification response means for, on receipt of an audio information notification request from said communication terminal device, determining whether or not information of said communication terminal devices is registered in said Closed User Group control database based on Closed User Group identification information in the group information received together with said audio information notification request, establishing radio communication among the communication terminal devices in the group information of said communication terminal devices in accordance with the determination result, and transmitting to said communication terminal device, a response result whether or not to respond to the audio information notification request received from said communication terminal device; and audio information relaying means for, on receipt of the audio information to said second communication terminal device from said communication terminal device, transmitting said received audio information to said second communication terminal device.

59. The radio communications system according to claim 58, wherein:

said communication terminal device further has group information storage means for storing said group information acquired from said Closed User Group server by said radio communication group acquisition means; and said audio information notification requesting means transmits to said server, together with said group information, an audio information notification request for notifying audio information to the second communication terminal device in said group information stored by said group information storage means.

60. The radio communications system according to claim 59, wherein:

said radio communications group acquisition means makes connection with said Closed User Group server, and acquires said group information from said Closed User Group server; and said audio information notification requesting means transmits to said server, together with said group information, an audio information notification request for notifying audio information to a second PTT communication terminal device in said group information acquired by connection to said Closed User Group server.

61. The radio communications system according to claim 60, wherein:

said communication terminal device further has audio information simultaneous notification requesting means for transmitting to said server, audio information to the second communication terminal device, together with an audio information notification request for notifying audio information to the second communication terminal device in said group information acquired from said Closed User Group server; and said server further has audio information simultaneous transmission means for transmitting to said second communication terminal device, the audio information received together with said audio information notification request from said communication terminal device.

62. The radio communications system according to claim 61, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

63. The radio communications system according to claim 61, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

64. The radio communications system according to claim 59, wherein:
said communication terminal device further has audio information simultaneous notification requesting means for transmitting to said server, audio information to the second communication terminal device, together with an audio information notification request for notifying audio information to the second communication terminal device in said group information acquired from said Closed User Group server; and
said server further has audio information simultaneous transmission means for transmitting to said second communication terminal device, the audio information received together with said audio information notification request from said communication terminal device.

65. The radio communications system according to claim 64, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

66. The radio communications system according to claim 64, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

67. The radio communications system according to claim 59, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

68. The radio communications system according to claim 58, wherein:
said radio communications group acquisition means makes connection with said Closed User Group server, and acquires said group information from said Closed User Group server; and
said audio information notification requesting means transmits to said server, together with said group information, an audio information notification request for notifying audio information to a second PTT communication terminal device in said group information acquired by connection to said Closed User Group server.

69. The radio communications system according to claim 68, wherein:
said communication terminal device further has audio information simultaneous notification requesting means for transmitting to said server, audio information to the second communication terminal device, together with an audio information notification request for notifying audio information to the second communication terminal device in said group information acquired from said Closed User Group server; and
said server further has audio information simultaneous transmission means for transmitting to said second communication terminal device, the audio information received together with said audio information notification request from said communication terminal device.

70. The radio communications system according to claim 69, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

71. The radio communications system according to claim 69, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

72. The radio communications system according to claim 68, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

73. The radio communications system according to claim 58, wherein:
if it is determined that the information of said communication terminal device is registered in said Closed User Group control database, said audio information notification response means establishes radio communication among the communication terminal devices in the group information of said communication terminal devices, and transmits to said communication terminal device, a response result that the audio information notification request received from said communication terminal device is to be responded; and
if it is determined that the information of said communication terminal device is not registered in said Closed User Group control database, said audio information notification response means does not establish radio communication among the communication terminal devices in the group information of said communication terminal devices, and transmits to said communication terminal device a response result that the audio information notification request received from said communication terminal device is not to be responded.

74. The radio communications system according to claim 73, wherein:
said communication terminal device further has audio information simultaneous notification requesting means for transmitting to said server, audio information to the second communication terminal device, together with an audio information notification request for notifying audio information to the second communication terminal device in said group information acquired from said Closed User Group server; and
said server further has audio information simultaneous transmission means for transmitting to said second communication terminal device, the audio information received together with said audio information notification request from said communication terminal device.

75. The radio communications system according to claim 74, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

76. The radio communications system according to claim 74, wherein, if it is determined that the information of said communication terminal device is registered in said Closed User Group control database, said audio information simultaneous transmission means establishes radio communication among the communication terminal devices in the group information of said communication terminal devices, and transmits to said second communication terminal device the audio information received together with said audio information notification request from said communication terminal device.

77. The radio communications system according to claim 73, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

78. The radio communications system according to claim 58, wherein:
said communication terminal device further has audio information simultaneous notification requesting means for transmitting to said server, audio information to the second communication terminal device, together with an audio information notification request for notifying audio information to the second communication terminal device in said group information acquired from said Closed User Group server; and
said server further has audio information simultaneous transmission means for transmitting to said second communication terminal device, the audio information received together with said audio information notification request from said communication terminal device.

79. The radio communications system according to claim 78, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

80. The radio communications system according to claim 78, wherein, if the authentication result received from said Closed User Group server is an authentication result that information of said communication terminal device is stored in the group information stored by said group information storage means, said audio information simultaneous transmission means establishes radio communication among the communication terminal devices in the group information of said communication terminal devices, and transmits to said second communication terminal device the audio information received together with said audio information notification request from said communication terminal device.

81. The radio communications system according to claim 78, wherein, if it is determined that the information of said communication terminal device is registered in said Closed User Group control database, said audio information simultaneous transmission means establishes radio communication among the communication terminal devices in the group information of said communication terminal devices; and transmits to said second communication terminal device the audio information received together with said audio information notification request from said communication terminal device.

82. The radio communications system according to claim 58, wherein:
the second communication terminal device in said group information comprises at least one of communication terminal devices in said group information; and
said communication terminal device further has second communication terminal device setting means for selecting at least one of communication terminal devices in said group information and setting the second communication terminal device in said group information.

83. A radio communications method implemented with a radio communications system comprising a plurality of communication terminal devices for performing radio communication with a press-talk switch, a server for establishing radio communication among said communication terminal devices, and a plurality of Closed User Group servers for controlling said communication terminal devices for establishing said radio communication, said server and said Closed User Group server respectively being owned by different companies, said method comprising:
a group information registration step of, by said Closed User Group server, making a group among particular communication terminal devices to implement radio communication with said press-talk switches, and registering group information where Closed User Group identification information for identifying Closed User Group servers is given to the made group, in a storage section of said Closed User Group server;
an audio information notification requesting step of, by a first communication terminal device, acquiring said group information from said Closed User Group server, and transmitting to said server, together with said group information, an audio information notification request for notifying audio information to a second communication terminal device in the acquired group information; and a radio communications establishment step of, by said server, acquiring, on receipt of the audio information notification request from said first communication terminal device, based on the Closed User Group identification information in the group information received together with said audio notification request, the group information of said first communication terminal device from said Closed User Group control database, establishing radio communication among the communication terminal devices in the acquired group information, and transmitting audio information to the second communication terminal device in said group information.

84. The radio communications method according to claim 83, wherein, in said audio information notification requesting step, said first communication terminal device stores said group information acquired from said Closed User Group server in a storage section of said first communication terminal device, and transmits to the server together with the group information, an audio information notification request for notifying audio information to the second communication terminal device in the stored group information.

85. The radio communications method according to claim 84, further comprising:

an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and an audio information simultaneous transmission step of, by said server, transmitting to said second communication terminal device, the audio information received together with said audio information notification request from said first communication terminal device.

86. The radio communications method according to claim 85, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

87. The radio communications method according to claim 85, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

88. The radio communications method according to claim 84, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

89. The radio communications method according to claim 83, wherein, in said audio information notification requesting step, said first communication terminal device accesses said Closed User Group server, acquires said group information from said Closed User Group server, and transmits to said server together with said group information an audio information notification request for notifying audio information to the second communication terminal device in the acquired group information.

90. The radio communications method according to claim 89, further comprising:

an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and an audio information simultaneous transmission step of, by said server, transmitting to said second communication terminal device, the audio information received together with said audio information notification request from said first communication terminal device.

91. The radio communications method according to claim 90, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

92. The radio communications method according to claim 90, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

93. The radio communications method according to claim 89, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

94. The radio communications method according to claim 83, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

95. A radio communications method implemented with a radio communications system comprising a plurality of communication terminal devices for performing radio communication with a press-talk switch, a server for establishing radio communication among said communication terminal devices, a plurality of Closed User Group servers for controlling said communication terminal devices for establishing said radio communication, and a Closed User Group control database for controlling said Closed User Group servers, said server and said Closed User Group server respectively being owned by different companies, said method comprising:

- a group information registration step of, by said Closed User Group server, making a group among particular communication terminal devices to implement radio communication with said press-talk switches, and registering group information where Closed User Group identification information for identifying Closed User Group servers is given to the made group, in a storage section of said Closed User Group server;
- a second group information registration step of, by said Closed User Group server, registering the group information registered in said storage section, in said Closed User Group control database;
- an audio information notification requesting step of, by a first communication terminal device, acquiring said group information from said Closed User Group server, and transmitting to said server, together with said group information, an audio information notification request for notifying audio information to a second communication terminal device in the acquired group information; and
- a radio communications establishment step of, by said server, acquiring, on receipt of the audio information notification request from said first communication terminal device, based on the Closed User Group identification information in the group information received together with said audio notification request, the group information of said first communication terminal device from said Closed User Group control database, establishing radio communication among the communication terminal devices in the acquired group information, and transmitting audio information to the second communication terminal device in said group information.

96. The radio communications method according to claim 95, wherein, in said audio information notification requesting step, said first communication terminal device stores said group information acquired from said Closed User Group server in a storage section of said first communication terminal device, and transmits to the server together with the group information, an audio information notification request for notifying audio information to the second communication terminal device in the stored group information.

97. The radio communications method according to claim 96, further comprising:
an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
an audio information simultaneous transmission step of, by said server, transmitting to said second communication terminal device, the audio information received together with said audio information notification request from said first communication terminal device.

98. The radio communications method according to claim 97, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

99. The radio communications method according to claim 97, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

100. The radio communications method according to claim 96, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

101. The radio communications method according to claim 95, wherein, in said audio information notification requesting step, said first communication terminal device accesses said Closed User Group server, acquires said group information from said Closed User Group server, and transmits to said server together with said group information an audio information notification request for notifying audio information to the second communication terminal device in the acquired group information.

102. The radio communications method according to claim 101, further comprising:
an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
an audio information simultaneous transmission step of, by said server, transmitting to said second communication terminal device, the audio information received together with said audio information notification request from said first communication terminal device.

103. The radio communications method according to claim 102, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

104. The radio communications method according to claim 102, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

105. The radio communications method according to claim 101, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

106. The radio communications method according to claim 95, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

107. A radio communications method implemented with a radio communications system comprising a plurality of communication terminal devices for performing radio communication with a press-talk switch, a server for establishing radio communication among said communication terminal devices, a plurality of Closed User Group servers for controlling said communication terminal devices for establishing said radio communication, said server and said Closed User Group server respectively being owned by different companies, said method comprising:

a group information registration step of, by said Closed User Group server, making a group among particular communication terminal devices to implement radio communication with said press-talk switches, and registering group information where Closed User Group identification information for identifying Closed User Group servers is given to the made group, in a storage section of said Closed User Group server;

an audio information notification requesting step of, by a first communication terminal device, acquiring said group information from said Closed User Group server, and transmitting to said server, together with said group information, an audio information notification request for notifying audio information to a second communication terminal device in the acquired group information;

an authentication request transmission step of, by said server, on receipt of the audio information notification request from said first communication terminal device, selecting said Closed User Group server based on the Closed User Group identification information in the group information received together with said audio information notification request, and transmitting an authentication request of said first communication terminal device to said Closed User Group server;

an authentication response transmission step of, by said Closed User Group server, on receipt of an authentication request of the first communication terminal device from said server, determining whether or not information of said first communication terminal device is registered in the group information registered in said storage section by said group information registration step, and transmitting the authentication result to said server;

an audio information notification response step of, by said server, on receipt of an authentication result from said Closed User Group server, establishing radio communication among the communication terminal devices in the group information of said communication terminal devices in accordance with the authentication result, and transmitting to said first communication terminal device a response result whether or not to respond to the audio information notification request received from said first communication terminal device;

an audio information transmission step of, by said first communication terminal device, on receipt of said response result from said server, if said response result is an response result that said audio information notification request is to be responded, transmitting to said server, audio information to said second communication terminal device; and an audio information relaying step of, by said server, on receipt of the audio information to said second communication terminal device, transmitting said received audio information to said second communication terminal device.

108. The radio communications method according to claim 107, wherein, in said audio information notification requesting step, said first communication terminal device stores said group information acquired from said Closed User Group server in a storage section of said first communication terminal device, and transmits to the server together with the group information, an audio information notification request for notifying audio information to the second communication terminal device in the stored group information.

109. The radio communications method according to claim 108, further comprising:

an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and an audio information simultaneous transmission step of, by said server, transmitting to said second communication terminal device, the audio information received together with said audio information notification request from said first communication terminal device.

110. The radio communications method according to claim 109, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

111. The radio communications method according to claim 109, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

112. The radio communications method according to claim 108, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

113. The radio communications method according to claim 107, wherein, in said audio information notification requesting step, said first communication terminal device accesses said Closed User Group server, acquires said group information from said Closed User Group server, and transmits to said server together with said group information an audio information notification request for notifying audio information to the second communication terminal device in the acquired group information.

114. The radio communications method according to claim 113, further comprising:
an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
an audio information simultaneous transmission step of, by said server, transmitting to said second communication terminal device, the audio information received together with said audio information notification request from said first communication terminal device.

115. The radio communications method according to claim 114, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

116. The radio communications method according to claim 114, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

117. The radio communications method according to claim 113, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

118. The radio communications method according to claim 107, wherein:
in said audio information notification response step, if the authentication result that said server has received from said Closed User Group server is an authentication result that the information of said first communication terminal device is registered in the group information registered in said Closed User Group server, said server establishes radio communication among communication terminal devices in the group information of said first communication terminal device, and transmits to said first communication terminal device, a response result that said audio information notification request is to be responded; and
in said audio information notification response step, if the authentication result is an authentication result that the information of said first communication terminal device is not registered in the group information registered in said Closed User Group server, said server does not establish radio communication among communication terminal devices in the group information of said first communication terminal device, and transmits to said first communication terminal device, a response result that said audio information notification request is not to be responded.

119. The radio communications method according to claim 118, further comprising:
an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
an audio information simultaneous transmission step of, by said server, transmitting to said second communication terminal device, the audio information received together with said audio information notification request from said first communication terminal device.

120. The radio communications method according to claim 119, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

121. The radio communications method according to claim 119, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

122. The radio communications method according to claim 118, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

123. The radio communications method according to claim 107, further comprising:
an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
an audio information simultaneous transmission step of, by said server, transmitting to said second communication terminal device, the audio information received together with said audio information notification request from said first communication terminal device.

124. The radio communications method according to claim 123, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

125. The radio communications method according to claim 123, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

126. The radio communications method according to claim 123, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

127. The radio communications method according to claim 107, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

128. A radio communications method implemented with a radio communications system comprising a plurality of communication terminal devices for performing radio communication with a press-talk switch, a server for establishing radio communication among said communication terminal devices, a plurality of Closed User Group servers for controlling said communication terminal devices for establishing said radio communication, and a Closed User Group control database for controlling said Closed User Group servers, said server and said Closed User Group server respectively being owned by different companies, said method comprising:
 a first group information registration step of, by said Closed User Group server, making a group among particular communication terminal devices to implement radio communication with said press-talk switches, and registering group information where Closed User Group identification information for identifying Closed User Group servers is given to the made group, in a storage section of said Closed User Group server;
 a second group information registration step of, by said Closed User Group server, registering said group information registered in said storage section, in said Closed User Group control database;
 an audio information notification requesting step of, by a first communication terminal device, acquiring said group information from said Closed User Group server, and transmitting to said server, together with said group information, an audio information notification request for notifying audio information to a second communication terminal device in the acquired group information;
 an audio information notification response step of, by said server, on receipt of said audio information notification request from said first communication terminal device, determining whether or not information of said communication terminal devices is registered in said Closed User Group control database based on Closed User Group identification information in the group information received together with said audio information notification request, establishing radio communication among the communication terminal devices in the group information of said first communication terminal devices in accordance with the determination result, and transmitting to said first communication terminal device, a response result whether or not to respond to the audio information notification request received from said first communication terminal device;
 an audio information transmission step of, by said first communication terminal device, on receipt of said response result from said server, if the response result is a response result that said audio information notification request is to be responded, transmitting to said server, audio information to said second communication terminal device; and
 an audio information relaying step of, by said server, on receipt of the audio information to said second communication terminal device, transmitting said received audio information to said second communication terminal device.

129. The radio communications method according to claim 128, wherein, in said audio information notification requesting step, said first communication terminal device stores said group information acquired from said Closed User Group server in a storage section of said first communication terminal device, and transmits to the server together with the group information, an audio information notification request for notifying audio information to the second communication terminal device in the stored group information.

130. The radio communications method according to claim 129, further comprising:
 an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
 an audio information simultaneous transmission step of, by said server, transmitting to said second communication terminal device, the audio information received together with said audio information notification request from said first communication terminal device.

131. The radio communications method according to claim 130, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

132. The radio communications method according to claim 130, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

133. The radio communications method according to claim 129, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

134. The radio communications method according to claim 128, wherein, in said audio information notification requesting step, said first communication terminal device accesses said Closed User Group server, acquires said group information from said Closed User Group server, and transmits to said server together with said group information an audio information notification request for notifying audio information to the second communication terminal device in the acquired group information.

135. The radio communications method according to claim 134, further comprising:
an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
an audio information simultaneous transmission step of, by said server, transmitting to said second communication terminal device, the audio information received together with said audio information notification request from said first communication terminal device.

136. The radio communications method according to claim 135, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

137. The radio communications method according to claim 135, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

138. The radio communications method according to claim 134, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

139. The radio communications method according to claim 128, wherein:
in said audio information notification response step, if it is determined that the information of said first communication terminal device is registered in said Closed User Group control database, said server establishes radio communication among communication terminal devices in the group information of said first communication terminal device, and transmits to said first communication terminal device, a response result that said audio information notification request received from said first communication terminal device is to be responded; and
in said audio information notification response step, if it is determined that the information of said first communication terminal device is not registered in said Closed User Group control database, said server does not establish radio communication among communication terminal devices in the group information of said first communication terminal device, and transmits to said first communication terminal device, a response result that said audio information notification request received from said first communication terminal device is not to be responded.

140. The radio communications method according to claim 139, further comprising:
an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and
an audio information simultaneous transmission step of, by said server, transmitting to said second communication terminal device, the audio information received together with said audio information notification request from said first communication terminal device.

141. The radio communications method according to claim 140, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

142. The radio communications method according to claim 140, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

143. The radio communications method according to claim 139, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

144. The radio communications method according to claim 128, further comprising:

an audio information simultaneous notification requesting step of, by said first communication terminal device, transmitting to said server together with an audio information notification request for notifying audio information to the second communication terminal device in said group information acquired by said Closed User Group server, the audio information to said second communication terminal device; and an audio information simultaneous transmission step of, by said server, transmitting to said second communication terminal device, the audio information received together with said audio information notification request from said first communication terminal device.

145. The radio communications method according to claim 144, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

146. The radio communications method according to claim 144, wherein in said audio information simultaneous transmission step, if the authentication result that said server has received from said Closed User Group server is an authentication result that the information of said first communication terminal device is registered in the group information registered in said Closed User Group server, said server transmits to said second communication terminal device, the audio information that said server has received together with said audio information notification request from said first communication terminal device.

147. The radio communications method according to claim 144, wherein, in said audio information simultaneous transmission step, if said server determines that the information of said first communication terminal device is registered in said Closed User Group control database, said server transmits to said second communication terminal device, the audio information received together with said audio information notification request from said first communication terminal device.

148. The radio communications method according to claim 128, wherein the second communication terminal device in said group information comprises at least one of communication terminal devices in said information group, and the method comprises a step of, by said first communication terminal device, selecting at least one of communication terminal devices in said group information, and said first communication terminal device sets the second communication terminal device in said group information.

* * * * *